United States Patent
Cobb et al.

(10) Patent No.: US 8,799,794 B2
(45) Date of Patent: Aug. 5, 2014

(54) GRAPHICAL USER INTERFACE (GUI) BASED CALL APPLICATION SYSTEM

(75) Inventors: Dale L. Cobb, Colorado Springs, CO (US); Paul D. Gilbert, Colorado Springs, CO (US); Phyllis Santa, Larkspur, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1659 days.

(21) Appl. No.: 11/484,185

(22) Filed: Jul. 11, 2006

(65) Prior Publication Data
US 2006/0253789 A1    Nov. 9, 2006

Related U.S. Application Data

(63) Continuation of application No. 09/878,084, filed on Jun. 8, 2001, now Pat. No. 7,117,447.

(51) Int. Cl.
*G06F 3/00* (2006.01)
(52) U.S. Cl.
USPC ............................................. 715/762
(58) Field of Classification Search
None
See application file for complete search history.

(56) References Cited

U.S. PATENT DOCUMENTS

| | | | |
|---|---|---|---|
| 5,608,789 A * | 3/1997 | Fisher et al. | 379/201.03 |
| 5,878,418 A | 3/1999 | Polcyn et al. | |
| 5,913,195 A * | 6/1999 | Weeren et al. | 704/270 |
| 5,945,989 A * | 8/1999 | Freishtat et al. | 715/760 |
| 6,173,286 B1 | 1/2001 | Guttman et al. | |
| 6,173,437 B1 | 1/2001 | Polcyn | |
| 6,259,444 B1 | 7/2001 | Palmer et al. | |
| 6,385,204 B1 * | 5/2002 | Hoefelmeyer et al. | 370/401 |
| 6,393,481 B1 | 5/2002 | Deo et al. | |
| 6,642,942 B1 * | 11/2003 | Crook | 715/744 |
| 6,714,637 B1 * | 3/2004 | Kredo | 379/215.01 |
| 7,073,126 B1 * | 7/2006 | Khandekar | 715/709 |
| 2002/0083166 A1 | 6/2002 | Dugan et al. | |
| 2003/0093533 A1 * | 5/2003 | Ezerzer et al. | 709/227 |
| 2003/0198186 A1 | 10/2003 | Hoefelmeyer et al. | |
| 2004/0199375 A1 * | 10/2004 | Ehsani et al. | 704/4 |

FOREIGN PATENT DOCUMENTS

GB      2325062      11/1998

* cited by examiner

*Primary Examiner* — Enrique Iturralde

(57) ABSTRACT

An approach for providing self-service call plan application development is disclosed. A graphical system includes a computing system that is configured to cause a graphical user interface (GUI) to be present for automated creation of an application for controlling call flow logic. The application supports a predefined feature set. Additionally, the system includes a database that is coupled to the server and configured to store the application. The server is further configured to determine whether the application is valid and to initiate deployment of the application. The deployment may be performed on a real-time basis.

13 Claims, 23 Drawing Sheets

| Appl... | Order Num... | Ord... | SIS ID | Imm... | NLTD | NET | Ord... | Ord... | Modi... | Title | Sub... | App... | App... |
|---|---|---|---|---|---|---|---|---|---|---|---|---|---|
| DP | 5 | Saved | NG0... | | 1/31... | 1/24... | 1/8/... | Mod... | ADL | test... | JimD | Co... | 000... |
| DP | 12 | Saved | NG0... | | 1/10... | 1/9/... | 1/9/... | Mod... | | Tes... | TFN... | NG... | 000... |
| DP | 15 | Saved | | | | | 1/8/... | Cre... | | test... | JimD | | |
| DP | 17 | Saved | PI11... | | | | 1/8/... | Cre... | | test... | jimd | TF... | 011... |
| RP | 18 | Saved | | | 1/10... | 1/9/... | 1/8/... | Cre... | A | RP... | TFN... | | |
| RP | 19 | Saved | | | 1/10... | 1/9/... | 1/8/... | Cre... | | CP... | TFN... | | |
| DP | 20 | Saved | | | | | 1/8/... | Cre... | | Jim'... | JimD | | |
| DP | 27 | Saved | JD1... | | 2/1/... | 1/25... | 1/9/... | Cre... | | test... | JimD | JIM... | 011... |
| RP | 51 | Saved | | Imm... | 1/14... | 1/13... | 1/12... | Cre... | A | Pep... | Pep... | | |
| RP | 58 | Saved | rr44... | | 1/9/... | 1/1/... | 1/9/... | Cre... | | Ord... | Rao... | Ord... | |
| RP | 62 | Saved | | | 1/26... | | 1/10... | Cre... | | first... | first... | | |
| RP | 66 | Saved | | | 1/10... | 1/23... | 1/11... | Cre... | | next... | next... | | |
| DP | 68 | Saved | JD1... | | | | 1/11... | Mod... | ADL | test... | jimd | jim'd | 011... |
| RP | 75 | Saved | | | | | 1/11... | Cre... | | test2 | jimd | | |
| DP | 80 | Saved | KH0... | | 1/22... | 1/11... | 1/11... | Cre... | | 119... | Bob... | G120 | 001... |
| RP | 84 | Saved | | | | | 1/11... | Activ... | | acti... | jimd | | |
| DP | 86 | Saved | NG0... | | | 1/17... | 1/11... | Activ... | | test... | jimd | Co... | 000... |
| DP | 87 | Saved | JD1... | | 1/18... | | 1/11... | Activ... | | test | jimd | Jim's | 011... |
| RP | 103 | Saved | | | | | 1/11... | Cre... | | | 234 | | |
| DP | 131 | Saved | JD1... | | | | 1/11... | Activ... | | test | jimd | Jim... | 011... |
| DP | 132 | Saved | | | | | 1/11... | Cre... | | test | asdf | | |
| DP | 134 | Saved | JD1... | | | | 1/11... | Mod... | | test | jimd | Jim... | 011... |
| DP | 135 | Saved | NG0 | | | | 1/11 | Dis... | | test | jimd | Co | 000 |

Ok    Close

Warning: Applet Window

FIG. 5

GRAPHICAL USER INTERFACE (GUI) BASED CALL APPLICATION SYSTEM

RELATED APPLICATIONS

The present application is a continuation of U.S. patent application Ser. No. 09/878,084 filed on Jun. 8, 2001, the contents of which are hereby incorporated by reference.

FIELD OF THE INVENTION

The present invention relates to a communications system and more particularly to graphical system for developing call applications.

BACKGROUND OF THE INVENTION

As telecommunication technologies continue to advance, the sophistication of the customers of telecommunication services is increasing. The commercial sector has become reliant on the telecommunication service providers to supply call services (e.g., call centers, interactive voice response (IVR) platforms, etc.) with the flexibility to adapt to continually changing requirements. Sophisticated customers demand that they be given more control over their services, particularly with the prevalence of global networks (such as the Internet) to facility access to the necessary resources to self-manage the services. In addition, these customers require a wide range and robust set of features relating to the call services.

Conventionally, service providers offer managed telecommunication services to the customers, whereby call plan applications are created by the service provider based upon the requirements that is manually submitted by the customer. To create a call flow application in the conventional system, the service provider is faced with the daunting task of managing a series of manual processes and manual documents. A drawback of this traditional approach is that the approach is costly in terms of human resources. Another drawback is that this process is prone to errors and inaccuracies in implementing the requirements of the customer. These errors may also be introduced in the billing process, resulting in inaccurate billing of the customer. Yet another drawback of the conventional system is that delays and inefficiencies attend a manual process; that is, there is delay between submission of the call plan and deployment. Additionally, any testing and re-testing of the call plan application further adds to the delay. Conventional representations of call plans are not suitable for customer display, as the customer is unnecessarily exposed to too much implementation details. Additionally, conventional systems lack information (e.g., message text) that is needed by the customers. Conventional application profiles are text-based, free-format, making automated conversion into a graphical format unfeasible.

Therefore, there is a need for an automated approach to developing call plan applications. There is also a need to provide a graphical user interface (GUI) for development of the call plan applications. There is a further need to rapidly deploy the call plan applications on a real-time or near real-time basis. There is yet another need to provide an approach that minimizes errors in implementing customer requirements.

SUMMARY OF THE INVENTION

These and other needs are addressed by the present invention in which a call application system provides for graphically developing call plan applications. Through a web-based graphical user interface (GUI), a customer may create, review, and modify all elements of a call plan application and to deploy the call plan application in real time. The automated call plan application system supports an extended feature set, which includes audio play, database access, take back and transfer (TNT), logic branching, logical comparison, call extension, multiple entry points, exits, DTMF (Dual-Tone Multi-Frequency) input, jump, menu routing, recording audio, provisioning audio, manipulating data, and service independent voice recognition (SIVR).

According to one aspect of the present invention, a method for providing self-service call plan application development is disclosed. The method includes causing a graphical user interface (GUI) to be presented for automated creation of an application for controlling call flow logic. The application supports a predefined feature set. The method also includes determining whether the application is valid, and initiating deployment of the application in response to the determining step.

In another aspect of the present invention, a method for controlling call processing is provided. The method includes interfacing with a server via a graphical user interface (GUI). The server is configured to provide automated creation of an application for controlling call flow logic. The application supports a predefined feature set. The method also includes receiving an indication from the server that the application is valid, wherein the valid application is deployed.

In another aspect of the present invention, a system for providing self-service call plan application development is disclosed. The system includes a computing system that is configured to cause a graphical user interface (GUI) to be present for automated creation of an application for controlling call flow logic. The application supports a predefined feature set. Additionally, the system includes a database that is coupled to the server and configured to store the application. The server is further configured to determine whether the application is valid and to initiate deployment of the application.

In another aspect of the present invention, a graphical system for providing self-service call plan application development is disclosed. The graphical system includes means for causing a graphical user interface (GUI) to be presented for automated creation of an application for controlling call flow logic. The application supports a predefined feature set. The system also includes means for determining whether the application is valid; and means for initiating deployment of the application in response to the determination that the application is valid.

In another aspect of the present invention, a computer-readable medium carrying one or more sequences of one or more instructions for providing self-service call plan application development is disclosed. The one or more sequences of one or more instructions includes instructions which, when executed by one or more processors, cause the one or more processors to perform the step of causing a graphical user interface (GUI) to be presented for automated creation of an application for controlling call flow logic. The application supports a predefined feature set. Other steps include determining whether the application is valid, and initiating deployment of the application in response to the determining step.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a diagram of a list of orders screen of the GUI supported by the GAP system of FIGS. 1A and 1B;

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention provides a graphical approach for customers (i.e., subscriber of a service) of a service provider to create call plan applications. The graphical system provides a "self-managed" and automated service from the perspective of the customer. The graphical system supports automated creation of call plans, whereby the graphical user interfaces (GUIs) are utilized to create a graphical, logical representation of the call plan. This representation is then used to automatically create and implement a real call plan. This approach advantageously minimizes errors that are introduced by a manual, paper-based process of developing call plan applications.

Figure 1A:
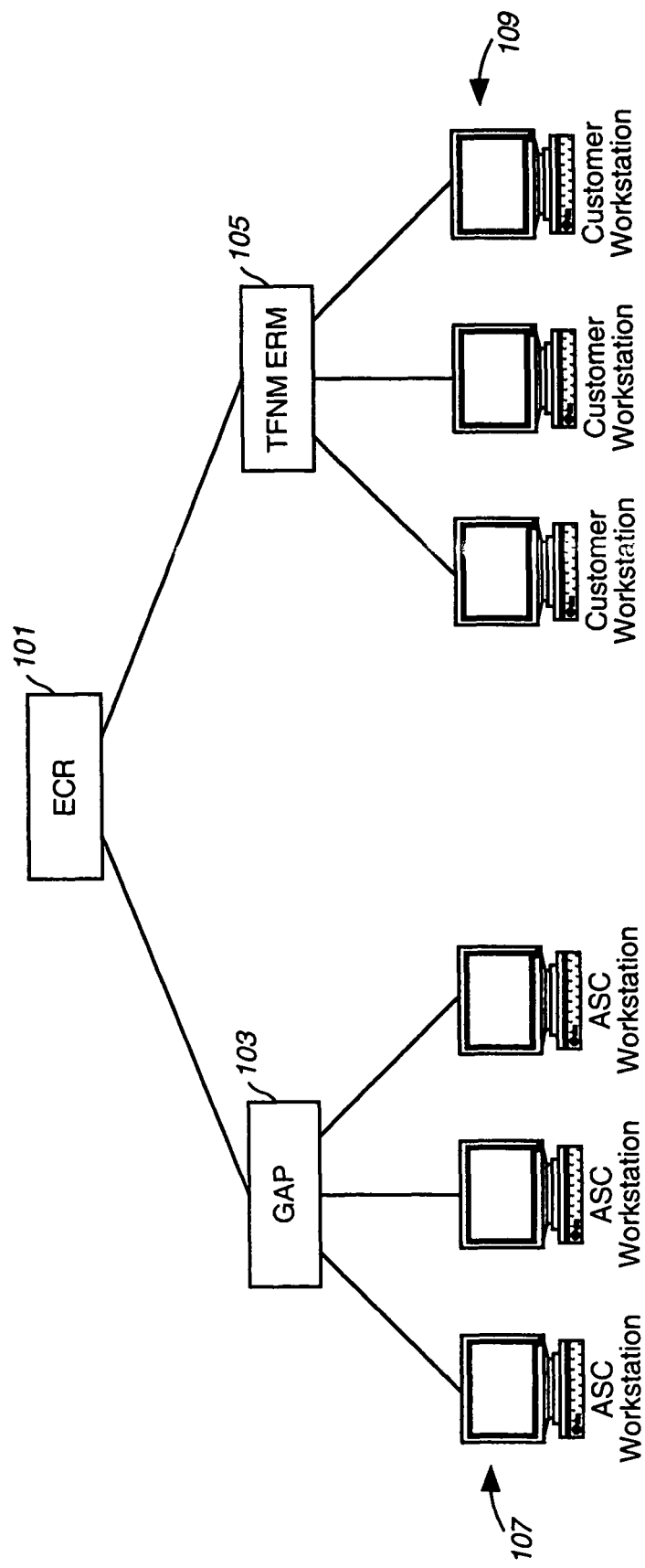
FIGS. 1A and 1B are diagrams of a Graphical User Interface (GUI) based call application system, according to an embodiment of the present invention.
Figure 1B:
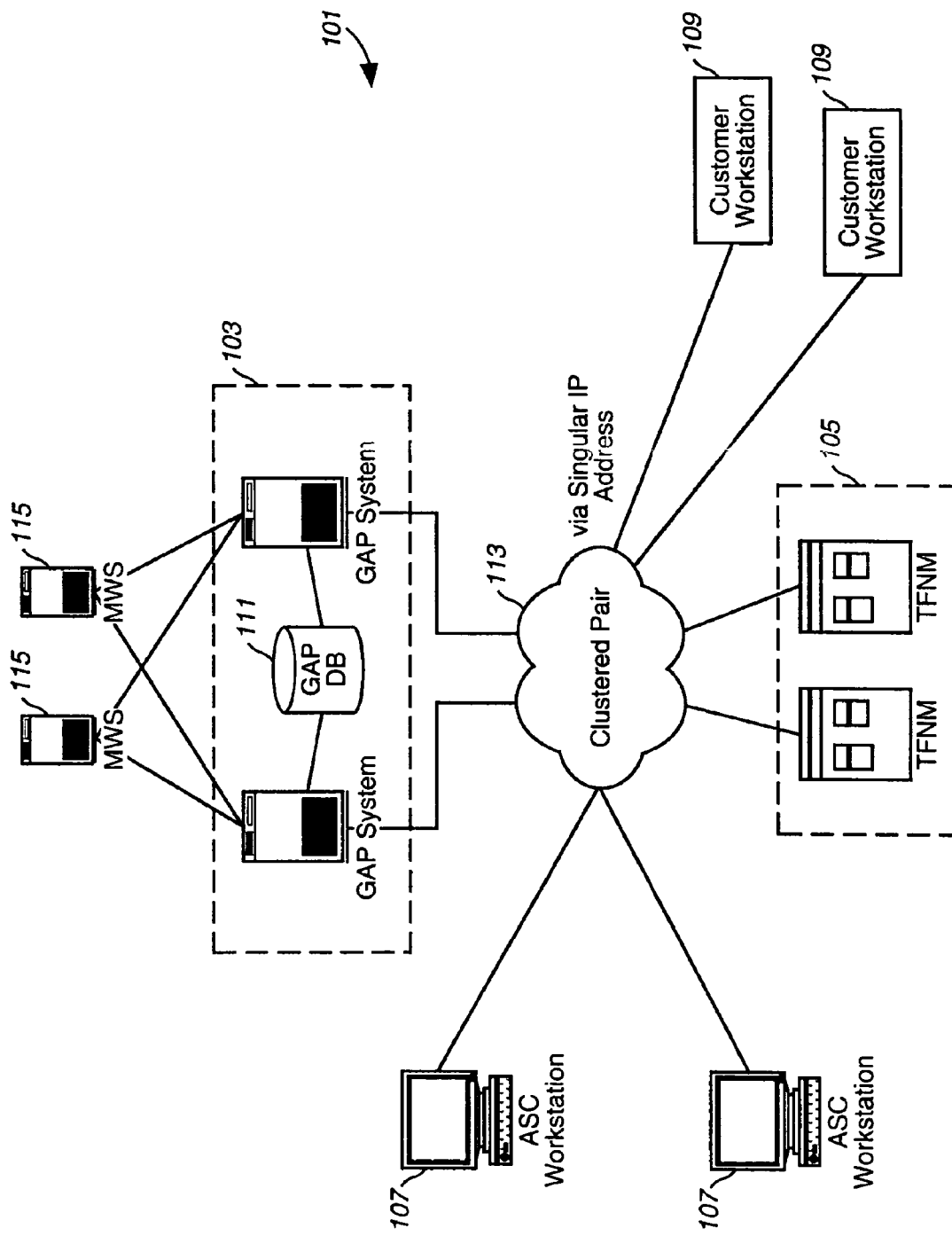

FIGS. 1A and 1B are diagrams of a Graphical User Interface (GUI) based call application system, according to an embodiment of the present invention. An Enhanced Call Routing (ECR) system 101, which in an exemplary embodiment, is a web-based system that provides customers with the capability to view and edit call plans in a graphical format. As shown in FIG. 1A, the ECR system 101, according to an exemplary embodiment, includes a graphical applications profile (GAP) system 103 and a Toll-Free Network Manager (TFNM) Enhanced Routing Manager (ERM) 105. As will be more fully described, the GAP system 103 can be accessed by Application Support Center (ASC) workstations associated with a telecommunications service provider or via workstations 109 that are maintained by the customer. In this example, the customer workstations 109 interface primarily with the TFNM ERM 105; however, as will become evident, the customer workstations 109 and ASC workstations 103 interface seamlessly with the ECR 101 in general.

The ECR system 101 enables the creation and maintenance of call profiles (i.e., GAP versions) by ASC staff using the ASC workstations 107, and includes a repository 111 of all GAP data (FIG. 1B). That is, profiles that are created via the GAP system 103 are referred to as GAP versions. Specifically, the ECR system 101 provides the capability to create, modify, and store Graphical Application Profiles. The ECR system 101 also permits a customer to submit change orders; the ECR system 101 supports a GAP user interface to allow the ASC to input change orders and to view and process customer-submitted orders. The GAP repository 111 is maintained by the ECR system 101 to allow GAP change orders to be stored. In addition, the ECR system 101 supports an access interface via the TFNM ERM 105 for external customers. An interface between the GAP Repository 111 and the TFNM 105 allows the TFNM 105 to modify GAP versions, submit change orders, and query the GAP System for order status.

The ECR system 101 provides a notification process that alerts the ASC staff of an Order from the TFNM 105 for the immediate deployment of audio or local database files. The ECR system 101 allows audio and local database changes to be automatically submitted to a provisioning system (not shown). An interface between the GAP System 103 and the Provisioning System supports audio and local database changes from the TFNM 105.

According to an embodiment of the present invention, the GAP System 103 is implemented as a clustered pair of servers that provide a singular presentation to the client. The GAP System 103 may detect change orders that include only audio and/or local database changes (i.e., no logic changes). Each server maintains a connection to each Management Workstation (MWS) 115 co-located at the site. The ASC accesses the GAP System 103 through the singular presentation, from multiple workstations 107 acting as clients. The Toll-Free Network Manager (TFNM) 105 accesses the GAP System 103 from one or more workstations 109 acting as clients in this context.

According to one embodiment of the present invention, the GAP system 103 provides for the creation and processing of orders for service node (SN) applications. A SN is an IVR platform that provides the interacts with a number of existing and developing network systems. The interfacing systems of the SN, in an exemplary embodiment include a DMS-250 Bridging Switches (manufactured by Norte®) for voice circuits, a Signaling Transfer Point (STP) for out-of-band call data, a Data Access Point (DAP) for routing and database information, a Service Control Manager (SCM) for N+1 failover, a Local Support Element (LSE) for network alarming, a Network Capabilities (NETCAP) for order entry (manual interface), a Parking Manager (PM) for instructions and management of parked calls, and a Service Creation Environment (SCE) to create, order, and maintain applications, templates, and composites. In addition, the SN platform includes an interface to a Host Connect Gateway providing the capability for the SN to connect directly to a customer host computer and query information or update a database.

The customers create most orders using a Toll-Free Network Manager (TFNM) system 105, which interfaces to the GAP system 103. The GAP system 103 supports the online creation of graphical representations of the conventional manual, paper-based call plan application profiles associated with complex call plan applications. These profiles are referred to as descriptive profiles (DPs). According to one embodiment of the present invention, DPs may include audio files and local databases. In an exemplary embodiment, DPs cannot be automatically converted to a call plan application.

The GAP system 103 supports another type of profile: runnable profiles (RPs). These RPs may be viewed online and can be automatically converted into applications; in which case the GAP assigns such profiles unique identifiers (IDs). The customers may create and update RPs using the TFNM system 105, which in turn sends RPs along with the orders to the GAP system 103.

The GAP system 103 maintains audio files and local databases (LDBs) (e.g., database 111) in support of the call plan application creation process. The TFNM 105 sends the audio files and the LDBs to the GAP system 103. These audio files and local databases may be downloaded to the ASC workstation (or a personal computer (PC)) from the GAP system 103 within the Application Support Center (not shown). It is noted that LDBs can also be uploaded from ASC PCs to the GAP system 103.

Profiles contain information about call flows that customers need without details on implementation, such as Release Link Trunk (RLT) information. As mentioned, the customers create RPs, view DPs, and create orders through the TFNM Enhanced Routing Manager (ERM) 105. The ERM is a GUI of the TFNM 105. The ASC accesses the GAP system 103 from multiple workstations (PCs), as does the TFNM 105.

The GAP system 103 can store multiple versions of a profile. In an exemplary embodiment, one profile is active at a time, and the GAP system sends only active DPs to the TFNM 105. To access the GAP system 103, the user may utilize a standard PC, which in an exemplary embodiment is loaded with a web browser (e.g., Microsoft Internet Explorer 4.0 or higher, or Netscape Communicator 4.0 or higher). The PC supports Java 1.2.2_006 or 1.2.2_007. The ECR 101 thus supports graphically creating profiles, as next discussed with respect to FIG. 2.

Figure 2:
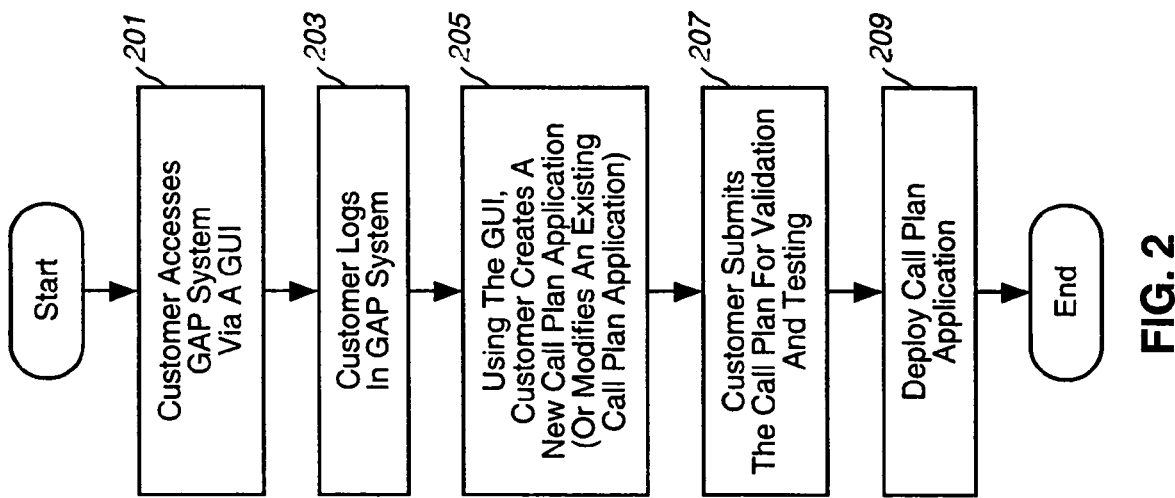
FIG. 2 is a flowchart of a call plan application process, in accordance with an embodiment of the present invention.

FIG. 2 is a flowchart of a call plan application process, in accordance with an embodiment of the present invention. In step 201, a customer accesses the GAP system 103 using a GUI resident on the customer workstation 109 (or PC). Next, the customer logs into the GAP system 103, per step 203. In step 205, the customer creates a new call plan application or modifies an existing call plan application using the GAP system 205. The details of this process are more fully described later. Thereafter, the customer may submit the call plan application for validation and testing (per step 207). The call plan application is then deployed, as in step 209; this deployment can be performed on a real-time basis by the GAP system 103. Using the GAP system 103, the customer, which for explanatory purposes is an airline, may create a call plan as follows:

| CALL FLOW LOGIC | | |
|---|---|---|
| DATABASE ROUTING | Look-up 800 number in Database (DB1) | 1 |
| If Found | Go to WELCOME | |
| If not found | Outdial on 8005550000 | |
| WELCOME | Play Message | 1 |
| | Goto MAIN MENU | |
| MAIN MENU | | |
| If the caller presses | | |
| 1 = New Customer | Play Msg | 5 |
| | Go to DB1 ROUTING | |
| 2 = WorldCom Customer | Play Msg | 5 |
| | Go to DB1 ROUTING | |
| 3 = Airline | Play Message | 3 (Thanks) |
| | Go to DB1 ROUTING | |
| * = Repeat this menu | Go to MAIN MENU | |
| Invalid/Timeout (1st time) | Play Message Go back to MAIN MENU | 4 |
| Invalid/Timeout (2nd time) | Play Message Go to DB1 ROUTING | 3 (Thanks) |
| DB1 ROUTING | | |
| If the caller selected | | |
| Opt3/Airline | Use 1st outdial from DB | |
| Opt2/WorldCom | Use 2nd outdial from DB | |
| Opt1/DEFAULT | Use 3rd outdial from DB | |
| 2nd Invalid-TO | | |

Message 1 (Welcome)
Thank you for calling WorldCom regarding the Airlines Plus program
Message 2 (Main Menu)
If you wish to learn more about becoming a WorldCom customer, press 1.
If you are already a WorldCom customer, press 2.
If you are calling to reach flight reservations or information, press 3.
To repeat the options, press the star key.
Message 3 (Thanks)
Thank you. One moment please.
Message 4 (Invalid/Timeouts)
The selection was invalid. Please try again.
Message 5 (Infoblast)
Thank you. One moment please. Please have your Plus number ready for faster service.
Message 6 (BRNA)
We're sorry the reservation line is not available at this time. Please try that number directly at 800-xxx-xxxx at a later time. Thank you.

The GAP system 103 uses nodes to display information about orders and profiles: order nodes, call plan nodes, message nodes, and data nodes. Order nodes are nodes that define the orders. Call plan nodes define the logic of a profile. Message nodes define audio messages, and data nodes define variables, records, and databases. Table 1 shows the types of order nodes utilized in the GAP system 103.

TABLE 1

| Node Name | Description |
| --- | --- |
| Order | Describes the order and the associated application. |
| Customer Data | Provides information about the customer for the application. |
| Status Info | Provides information on the state of the order. |

Table 2, below, lists the types of call plan node that are defined within the GAP system.

TABLE 2

| Node Name | Description |
| --- | --- |
| Action | Specifies miscellaneous operations that the other Call Plan nodes cannot do; for example, mathematical operations. |
| Audio | Plays a message to one of the parties in a call. |
| Call | Extends (transfers) a call. |
| Call Profile | Specifies properties that apply to the whole profile set (multiple versions of a profile) and to a particular version; it does not specify any operation. |
| DB Lookup | Looks up information in a local, network, Data Access Point (DAP), or HostConnect database. |
| Decision | Directs the call flow to one of several paths, depending on criteria the user specifies. |
| Entry Point | Acts as the starting point for a call. |
| Exit | Ends the call flow path. |
| Goto | Directs the call flow to a Target node. |
| Input | Specifies a prompt to be played to the caller (optional), gets the caller's DTMF (Dual Tone Multi-Frequency) input, and error checks the input. The input can consist of multiple characters. |
| Jump | Transfers control of the call flow to an Entry Point node in a profile for a different application. |
| Menu | Specifies a prompt to be played to the caller (optional), gets the caller's single-character DTMF input, and error checks the input. |
| Target | Receives control of the call flow from a Goto node. |
| Untyped | Acts as a placeholder for new nodes. |

As regards the message nodes, Table 3 shows the types of nodes that are used in the GAP system.

TABLE 3

| Node Name | Description |
| --- | --- |
| System messages | Specifies messages that are predefined in the GAP system. |
| Custom messages | Allows users to define messages. |
| Untyped | Acts as a placeholder for new nodes. |

Table 4 lists the data node types that are used by the GAP system.

TABLE 4

| Node Name | Description |
| --- | --- |
| Variables | There are two types of variables. Both hold single values. |
| System variables | Allows selection of a predefined variable. |
| Custom variables | Enables user to define variables. |
| Record data | Allows user to define multiple fields; for example, <customer_record.account_#.date>. |

TABLE 4-continued

| Node Name | Description |
| --- | --- |
| Database variables | Allows user to define databases to be used in the call flow. |
| Untyped | Acts as a placeholder for new nodes. |

Orders and profiles have three properties in common: system IDs (SIS ID), version number, and Corp ID. The Corp ID provides a unique identifier for a corporate entity; it is recognized that any type of entity may employed. SIS IDs identify applications and profiles. The same SIS ID applies to all versions of a particular profile. SIS IDs and Corp IDs correspond to each other, with a one-to-one relationship. When the three properties are the same in an order and a profile, the order is for that profile (the order and the profile are linked). Table 5 lists the relationships among the SIS ID, version number, and Corp ID.

TABLE 5

| Property | How Related in Linked Orders and Profiles |
| --- | --- |
| SIS ID | Changing the SIS ID in either the order or the profile changes it in both. Changing the SIS ID and the application ID in the profile changes the profile only. The order keeps the original SIS ID, and the order and the profile are no longer linked. |
| Version number | Changing the version number in the order changes only the order, and changing it in the profile changes only the profile. The order and the profile are no longer linked. This is true even if the profile was opened directly from the order (Tools menu) Changing the version number in a previously saved profile acts as a save as. The profile with the old version number will still be available. |
| Corp ID | Changing the Corp ID in the DP also changes the ID in the order. The Corp ID cannot be changed directly in a linked order. |

In accessing the GAP system 103, the user launches the web browser and enters the URL (Uniform Resource Locator) (i.e., web address) for the GAP system 103; the URL is provided by the system administrator. The GAP system displays a dialog box for entering a predefined user name and password. Upon validation of the login information, the user may begin using the GAP system 103 to create and modify orders and profiles.

Figure 3:
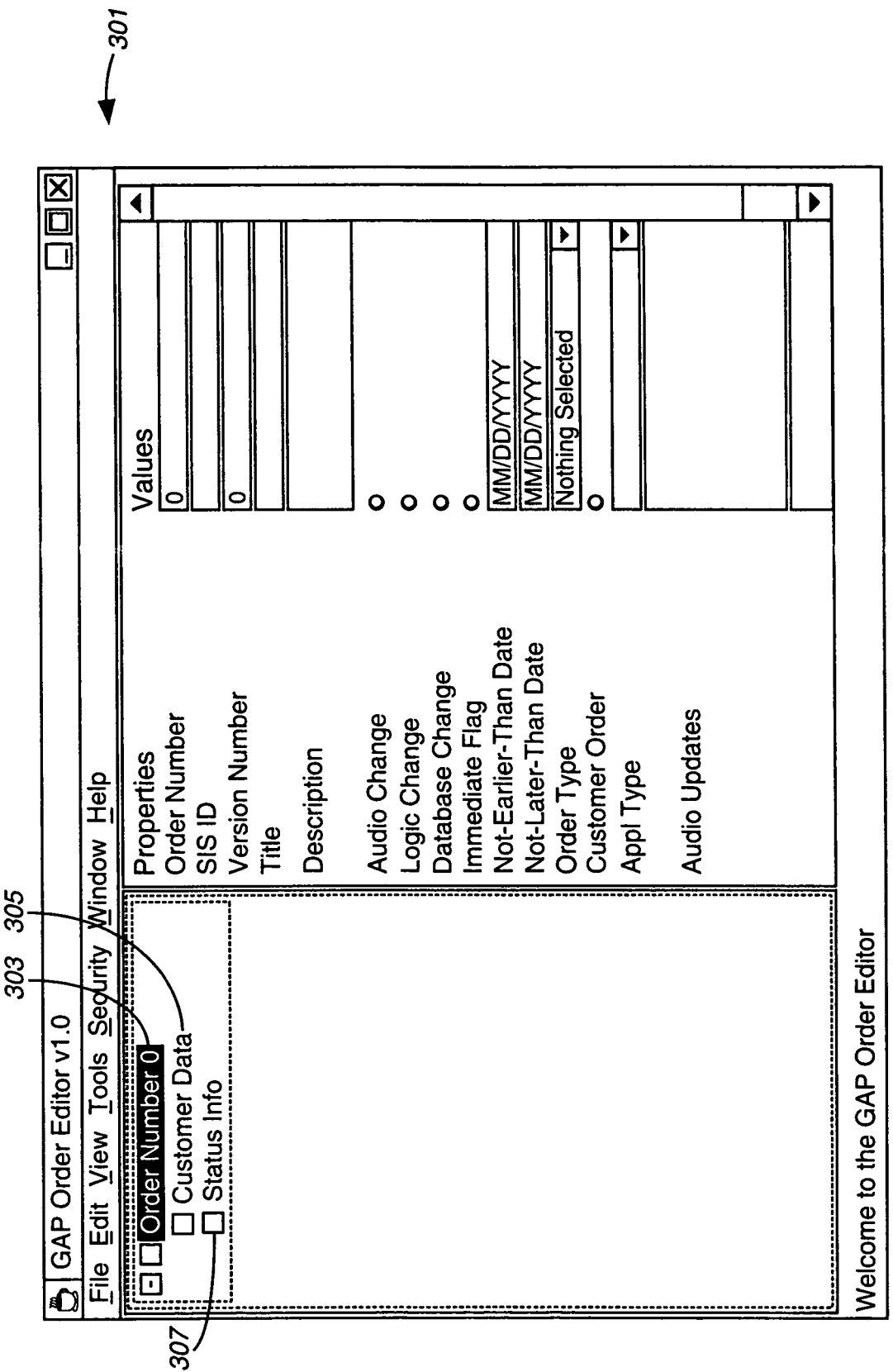
FIG. 3 is a diagram of an order editor screen, which shows status information, according to the GUI supported by the Graphical Application Profile (GAP) system of FIGS. 1A and 1B.

FIG. 3 is a diagram of an order editor screen of the GUI supported by the GAP system of FIGS. 1A and 1B. The Order Editor screen 301 provides the tools the user needs to create and process orders. The user may create or process orders. The user can have more than one order and profile window open simultaneously. The user then proceeds to fill in the properties as prompted by the Order Editor screen 301. Node properties provide information about orders, such as whether the order is for a new or modified application. Each order has an Order node 303, a Customer Data node 305, and a Status Info node 307. It is noted that the user cannot change the intent of an order. For example, if an audio file is sent with the order, the user cannot deselect the Audio Change property. The user can only change property values when a Customer Order Flag property is not selected. On all GAP trees, the selected node is highlighted. Nodes with missing required properties are highlighted.

The Order node 303 is the root node of the Order tree. According to an exemplary embodiment, the order node 303 has two children: the Customer Data node 305 and the Status Data node 307. TFNM provides a view of all order node settings. Table 6, as shown below, lists the order properties.

TABLE 6

| Property | Description |
| --- | --- |
| Order Number | Displays a unique, system-generated identifier for the order. The user cannot change the number. |
| SIS ID | Allows the user to enter the SIS ID of the application affected by this order, or displays a previously assigned SIS ID. On a saved order, the user can only add a SIS ID; the user cannot change an existing one. Length: 8 characters (first character must be alpha). Required for save if the user has entered a version number. Required for validation if Order Type is Activate, Disconnect, or Modify. |
| Title | Allows the user to enter a short description of the order, or displays the TFNM entry. Length: 50 characters max. Required for submitting an order. |
| Not-Earlier-Than Date | Allows the user to enter the earliest date at which the customer wants the application changes made, or displays the TFNM entry. Not-Earlier-Than Date can be the same as Not-Later-Than Date. If the Immediate Flag has been selected, Not-Earlier-Than Date cannot be later than the submission date (Date Pending on the Status Data node). |
| Not-Later-Than Date | Allows the user to enter the date by which the customer wants the order to be completed, or displays the TFNM entry. Not-Earlier-Than Date can be the same as Not-Later-Than Date. |
| Description | Allows the user to describe the order, or displays the TFNM entry. For example, in a modifyorder, this field should describe all the desired application changes. Selecting the field displays an Order Description Editor, where the user can enter or read the description. |
| Version Number | Create, Modify, or Activate orders only. (For Disconnect application orders, there must not be a version number.) Allows the user to enter the Version Number of the profile affected by this order, or displays the TFNM entry. For Modify orders, Version Number initially identifies the version being modified. If a new version is created to satisfy the order, change Version Number to the new number. Required for validation if the Order Type is Activate or Modify. Default: Next number available for the profile set. |
| Audio Change | Modify orders only. Allows the user to specify whether the order contains a new audio message or a change to an existing message, or displays the TFNM entry. Default: Not selected. |
| Logic Change | Modify orders only. Allows the user to specify whether the order requests a change to the call flow, or displays any TFNM entry. A call flow with a new audio message or database has a logic change; a call flow that only updates an existing message or LDB does not. Default: Not selected. |
| Database Change | Allows the user to specify whether the order contains a new LDB or a change to an existing LDB, or displays the TFNM entry. Default: Not selected. |
| Immediate Flag | Allows the user to specify whether the application requires immediate deployment, or displays the TFNM entry. (If the order is for an inactive application, the order normally would not be immediate.) Default: Not selected. |
| Order Type | Allows the user to describe work to be done on the application, or displays the TFNM entry. Once the order has been saved, the user cannot change Order Type. |

TABLE 6-continued

| Property | Description |
| --- | --- |
| | Required for save and validation. |
| | Create — A new application will be built. If the order has a SIS ID and Version number, there must be a corresponding profile. |
| | Modify — An existing application will be updated. If the order has a SIS ID and Version number, there must be a corresponding profile. |
| | Activate — An existing application will be deployed without changes. If the order has a SIS ID and version number, there must be a corresponding profile. The profile must be validated. |
| | Disconnect — An application will be taken out of production. If an order has a SIS ID and version number, there must be a corresponding profile. |
| Customer Order Flag | Indicates the current owner of the order: either the customer or the ASC. The flag is turned off for ASC orders. The user can turn on the flag manually when the user work on an order on behalf of a customer, but once the user saves the order, the user will no longer be able to change it. The system automatically turns the flag on when the order status is Returned. |
| Audio Updates | Audio change orders only. Displays any message number and talent information that TFNM has entered for a profile. |
| LDB Updates | Modify orders with a database change only. Displays any TFNM-entered LDB database ID. |

The Customer Data node 1005 contains some of the information contained in a profile. Table 7 enumerates the nodes and associated description relating to the Customer Data node.

TABLE 7

| Node Name | Description |
| --- | --- |
| Appl CorpID | Allows the user to enter the unique identifier for the corporation (customer) that owns the application associated with this order, or displays the TFNM entry. When the Order Type is Activate, Disconnect, or Modify, Appl CorpID must be the same as Corp ID on the corresponding Call Profile node (SIS IDs must also match). Required for save and validation. |
| Submitter Name | Allows the user to enter the user name, or displays the name entered by TFNM. Default: Application Build Group for an ASC-created order. The Customer Name entry for a TFNM-created order. Required for save and validation. Length: 30 characters max. |
| Submitter Phone Number | Allows the user to enter the phone number of the customer contact or displays the TFNM entry. Default: None for an ASC-created order. Customer Phone Number entry for a TFNM-created order. Required for save and validation. Length: 20 characters max. |
| Submitter User ID | Allows the user to enter a user ID when the user saves the order, or displays the TFNM entry. Default: None Length: 20 characters max |

Table 8 lists the properties of the Status Info Node 1007, which contains information on the state of the order.

TABLE 8

| Node Name | Description |
|---|---|
| Implementor User ID | Allows the user to enter the user ID of the person assigned to build the profile. Orders with a status of assigned, inBuild, inQAtest, inCustomerTest, or complete must have an implementor user ID. The ID is not displayed on the TFNM system. Length: 20 characters max. |
| Order Status Change Date | Displays the date that an order was last saved. TFNM users can see the date. |
| Date Pending | Displays the date that the ASC or TFNM submitted the order. TFNM users can see the date. |
| Date Assigned | Displays the date that the ASC changed the Order Status to Assigned. TFNM users cannot see the date. |
| Date InBuild | Displays the date that the ASC changed the Order Status to inBuild. TFNM users cannot see the date. |
| Date InQAtest | Displays the date that the ASC changed the Order Status to inQAtest. TFNM users cannot see the date. |
| Date InCustomerTest | Displays the date that the ASC changed the Order Status to inCustomerTest. TFNM users cannot see the date. |
| Date Complete | Displays the date that the ASC changed the Order Status to Complete. TFNM users cannot see the date. |
| Date Cancelled | Displays the date that the ASC changed the Order Status to Cancelled. TFNM users cannot see the date. |
| Date Returned | Displays the date that the ASC changed the Order Status to Returned. TFNM users cannot see the date. |
| Order Status | Allows the user to specify or view the status of the order. The user cannot change the status of saved customer orders. |
|   new | The order has not yet been saved in the GAP system. The system automatically sets this status. |
|   saved | The order has been stored in the GAP system, but no action is requested. (Customers can save incomplete orders on TFNM.) The system automatically sets this status. |
|   pending | The order has been submitted to the GAP system for processing. The system automatically sets this status. An order and any attached RP must pass validation before it can be submitted. |
|   assigned | The ASC TC has given the order to an ACS builder (that is, the Implementor User ID property has been filled in.) |
|   inBuild | The ASC builder is working on a new profile or a profile with logic changes, or is working on the associated application. |
|   inQAtest | The application associated with the order is ready for testing by an ASC tester. This includes making sure that disconnected applications no longer take calls. Any audio or LDBs have been deployed to the test node. |
|   inCustomerTest | The application associated with the order is ready for testing by the customer before deployment. The ASC tester notifies the customer that the application is ready for testing. |
|   complete | Testing has been completed, and the application has been deployed and activated in production. |
|   cancelled | The order is no longer valid. |
|   returned | The order has been given back to the customer for modification. For example, incomplete, ambiguous, contradictory, or impossible-to-implement orders should be returned. |
| ASC Internal Comments | Allows the user to explain the order status, such as issues preventing the completion of the order. Comments are not displayed on the TFNM system. |
| ASC Comments to Customer | Allows the user to explain the order status to the customer, such as why an order was returned. |

The Order Editor screen 1001 provides File, Edit, View, Tools and Window menus for working with orders. Table 9 describes the commands associated with the File menu.

TABLE 9

| Command | Description |
|---|---|
| New | Creates a new order for aProfile. The GAP system will prompt the user to save modified orders before creating a new one in the same window. |
| Open | Displays an existing order. The user can specify the order number or select the order from a list that the user can sort by order number, status, SIS ID, Immediate Flag, or Not-Later-Than-Date (NLTD). The list of orders has a modify column with the following indicators:<br>A = audio<br>L = logic change<br>D = database<br>The GAP system will prompt the user to save modified orders before opening another one in the same window. |
| Close | Shuts the order. The GAP system will warn the user if the user try to close with unsaved changes. |
| Save | Stores changes to the order, and allows the user to submit the order. The GAP system automatically assigns an order number if the order has not been saved previously. The user is prompted to complete any required fields that have not been filled in. As previously mentioned, more than one person can work on an order at the same time. The changes that are saved last will be reflected when the order is opened again. Saving an order with an attached Profile will overwrite the previously saved version of the Profile. |
| Change SIS ID | Changes the system ID of the order and the linkedProfile. The user should change to a new SIS ID, unused in any existing application. The user need not save for the change to take affect. |

Table 10 lists the commands corresponding to the Edit menu for working with audio and LDB data.

TABLE 10

| Command | Description |
|---|---|
| Copy LDB Data | Duplicates LDB data for pasting into the Database node Data property. The database IDs must match. |
| Export LDB Data | Sends LDB data to the ASC PC for deployment to provisioning. The GAP system creates a file and directory. |

TABLE 10-continued

| Command | Description |
| --- | --- |
| Copy Audio Message Data | Duplicates Audio FileName and Text from the Audio Updates property to the corresponding properties in the Profile custom message node. The message number and talent ID on the audio update and the custom message must match. |
| Export Audio Message | ends a copy of one or more audio files to an ASC PC for deployment to provisioning. The GAP system creates a file and directory. |

Table 11 describes the commands that are supported by the View menu, which permits the user to change the display of the Order Editor.

TABLE 11

| Command | Description |
| --- | --- |
| Expand All | Displays the whole tree in the graph area. |
| Collapse All | Displays only the Order node in the graph area. |
| Node Properties/ Values | Turns the display of the Properties Palette on and off. Default: on |
| Status Bar | Turns the display of the Status Bar on and off. Default: on |

Table 12 shows the commands associated with the Tools menu for activating or disconnecting profiles as well as opening the profiles.

TABLE 12

| Command | Description |
| --- | --- |
| setActive | Makes the profile version associated with the order available for customer viewing through TFNM Activation triggers the provisioning process. |
| setInactive | Makes the profile version associated with the order unavailable for customer viewing through TFNM. |
| Retrieve CP from Order | Opens the profile with the same SIS ID and version number as the order. |
| Create CP for Order | Makes a new profile with the same SIS ID and version number as the order. Not used if such a profile already exists. |
| Disconnect | Removes the profile from service. It will no longer have a version number. |

Table 13 provides a description of the commands relating to the Window menu, which allows the user to open and select orders and profiles.

TABLE 13

| Command | Description |
| --- | --- |
| New Order Window | Opens the Order Editor. The user can have more than one window open at the same time. |
| New Call Profile Window | Opens the GAP Editor. The user can have more than one window open at the same time. |
| List Windows | Displays the Window Manager, which lists all open Order Editor and GAP Editor windows. Double click a window on the list to display it. |

After creating or modifying the order, the user should save the order for the changes to take effect. In the event that more than one person is simultaneously modifying an identical order, the changes that are saved last are reflected the next time the profile is opened. If a Customer Order Flag property is selected in the Order node, the user will not be able to change the order once the order is saved. The GAP system 103 provides a Status Confirmation window, whereby the user may specify whether the order has been saved or submitted. At this point, the user may select SAVE as the status.

The GAP system 103 supplies error messages, if there are problems with the order. Upon correcting the errors, the user waits for a message to indicate that the problems have been resolved; i.e., a "success" message. If the order is new, the GAP system 103 assigns an order number that the user can use to identify the order upon subsequent access of the order. The system fills in the Order Status Change Date property, and if the order is new, changes the order status.

Once an order has been created and saved, the user may elect to have the order processed by submitting the order to the GAP system 103. A submitted order can be assigned to a builder, cancelled, or returned to the customer. In an open order, the user may pull down the file menu and select Save. Thereafter, the Status Confirmation window is displayed, whereby the user selects a status of SUBMIT. The system 103 then sets the order status to pending, as shown on the Status Info node Order Status property. The system 103 also changes the Order Status Change Date property and fills in the Date Pending property on the Status Info node.

The order must be assigned to a builder before any other order processing can be done. The user can assign orders in any status, except assigned and complete. An assigned order can be shown to be in customer or QA (Quality Assurance) test, or can be cancelled or returned to the customer. Upon opening the order, the user may select the Status Info node and fill in the Implementor User ID property (as seen in FIG. 3). Additionally, the user may change the Order Status property to Assigned and subsequently save the order. The system changes the Order Status Change Date and fills in the Date Assigned property.

Once an order has been assigned to a builder, the user can continue processing the order, indicating its status throughout the process. The status includes: Create application and Modify application, Activate application, and Disconnect application. When the order is in the create application and modify application state, the user may create or modify aProfile, as well as update the SIS ID in an Profile. Additionally, in this state, any audio or LDB data may be exported (as more fully described later). When the application is tested, the order's Status Info node is altered such that the Order Status property is set to "in QAtest" or "inCustomerTest." Once the application has been tested, the profile is activated, and the Order Status property is set to complete. Once the disconnection has been tested, the Order Status property on the order's Status Info node is set to complete.

If an order cannot be completed, the order can be returned to the customer. In an open order, the Status Info node may set the Order Status property to Returned. Additionally, to cancel an order, in an open order, on the Status Info node the Order Status property is set to Cancelled.

Figure 4:
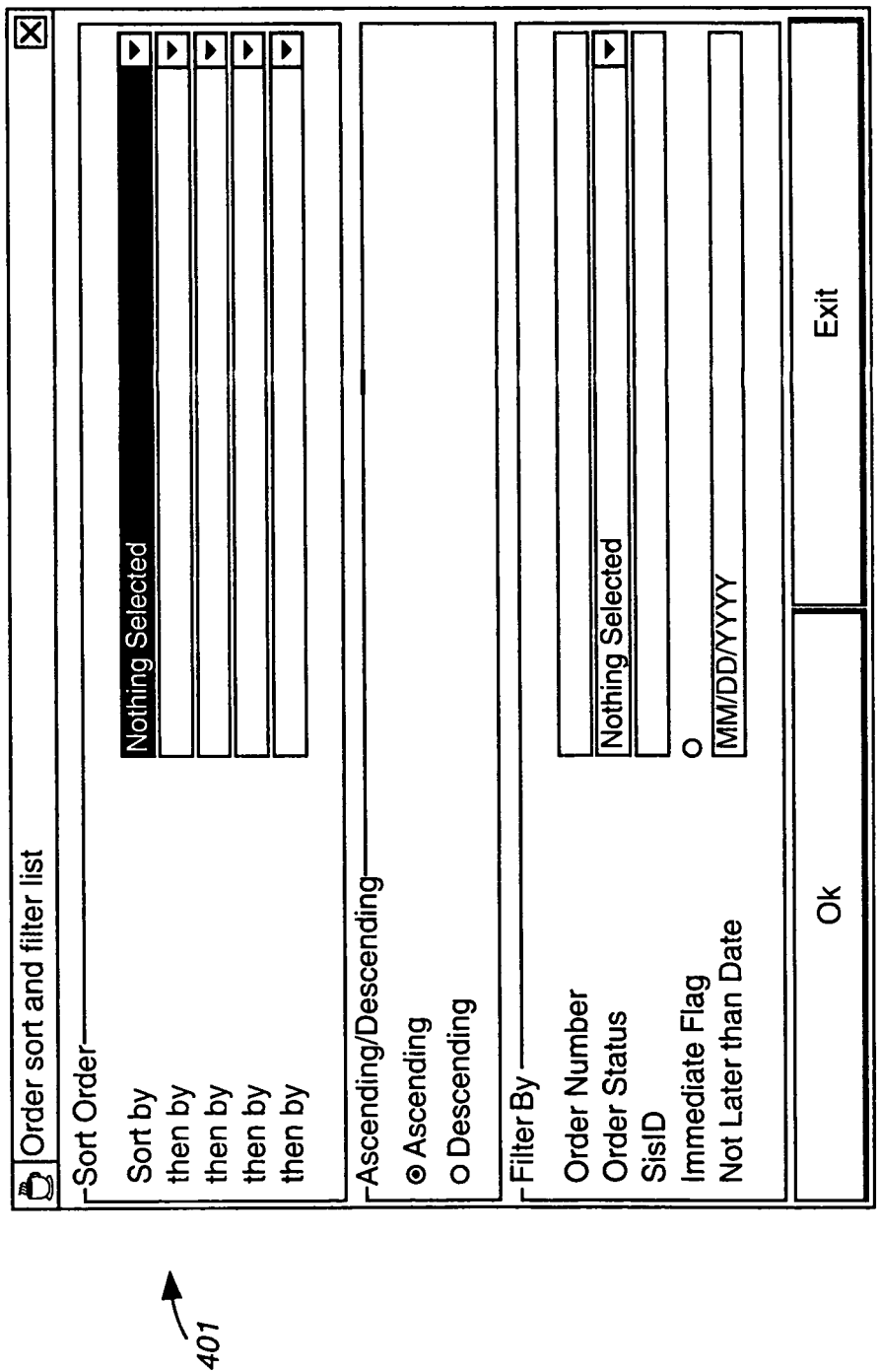
FIG. 4 is a diagram of a sort and filter screen of the GUI supported by the GAP system of FIGS. 1A and 1B.

FIG. 4 is a diagram of a sort and filter screen of the GUI supported by the GAP system of FIGS. 1A and 1B. The user can open an order using the order number or by selecting an order from a list (e.g., pull down list). If the user knows the order number, the user may select use the Open via Order Number command. If the user does not know the order number, the user may utilize the "Open from List" command. At this point, the Order Sort and Filter List window 401 is displayed; the Sort function determines the sequence in which the orders is to be displayed, while the Filter function determines whether certain orders will be displayed. The user then enters a sort or filter criteria. The result of the sort or filter criteria is shown in FIG. 5.

FIG. 5 is a diagram of a list of orders screen of the GUI supported by the GAP system of FIGS. 1A and 1B. A list of orders screen 501 shows all of the orders that satisfy the sort or filter criteria. The user may now select the desired order.

Figure 6:
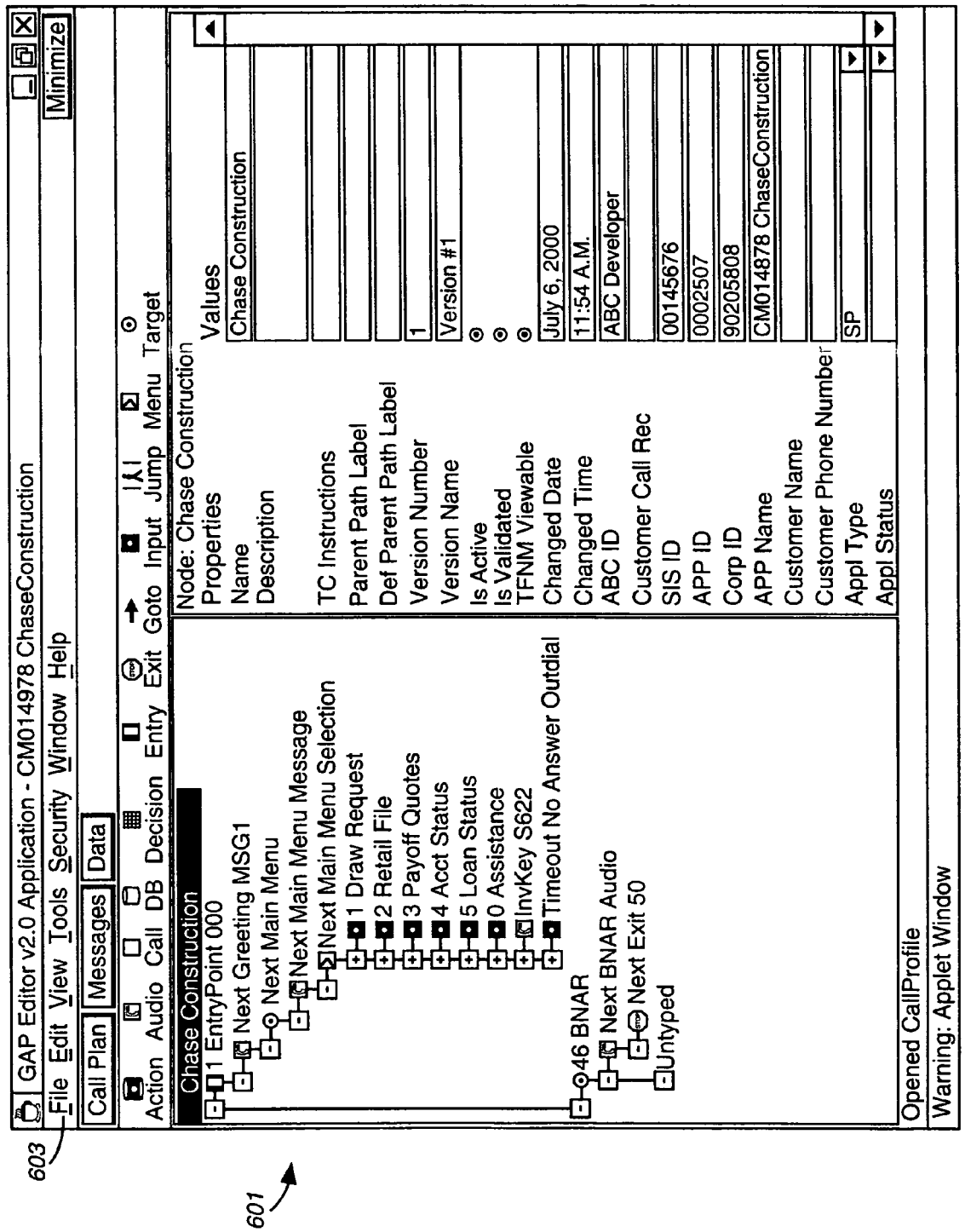
FIG. 6 is a diagram of a profile creation screen of the GUI supported by the GAP system of FIGS. 1A and 1B.

FIG. 6 is a diagram of a profile creation screen of the GUI supported by the GAP system of FIGS. 1A and 1B. The user may employ a GAP Editor screen 601 to create, view, and change the SIS ID and application ID of Profiles The customers use TFNM ERM to create Profiles. On the Window Manager, the user may click the New Call Profile Window button, or select an Order Editor window from the list of open windows. Alternatively, the user may create a new order, pull down the Tools menu and select the Create CP for Order command. If a GAP Editor is already displayed, as in this example, the user may pull down the File menu 603 and select New. At this time a new Call Plan tree is displayed.

Figure 7:
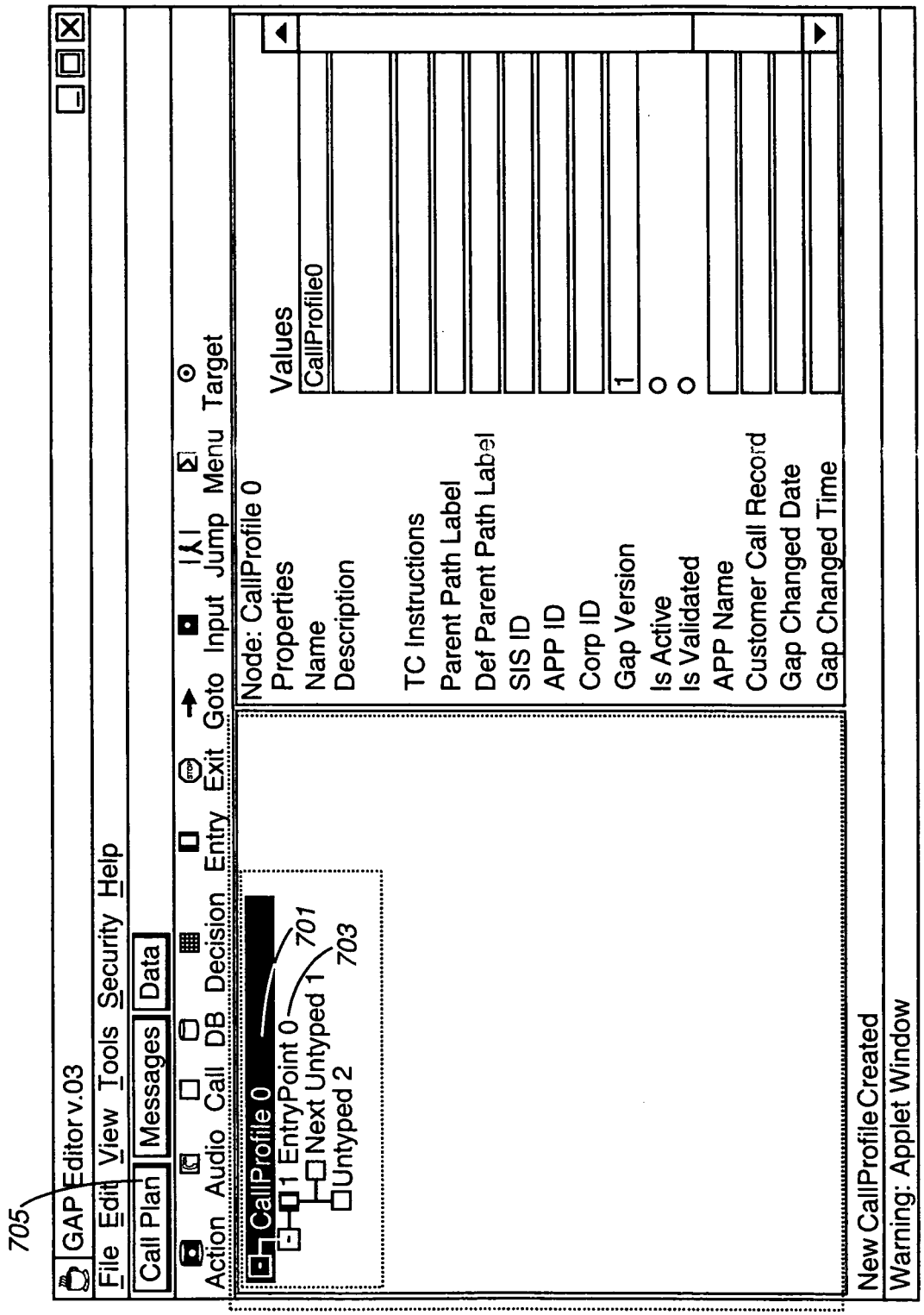
FIG. 7 is a diagram of an order editor screen of the GUI supported by the GAP system of FIGS. 1A and 1B.

FIG. 7 is a diagram of a call profile node as displayed by the GUI supported by the GAP system of FIGS. 1A and 1B. The GAP Editor screen 601 displays a new Call Plan tree with a Call Profile node (root node) 701 and an Entry Point child node 703. The user can open a profile directly or through an order. That is, the user does not need to open the corresponding order to open a profile. If the GAP Editor screen 601 is not already displayed, the user may click a New Call Profile button on a Window Manager screen, or select an Order Editor window from the list of open windows on the right. If the GAP Editor screen 601 is displayed, the user may pull down the File Menu and select Open. When the Open subcommands are displayed, the user may then open the profile based on the following parameters: Open via Sisid, ApplId, Active Version, or Open from List. If the order is already open or the SIS ID or application ID is unknown, the user can open the profile through the associated order. Profile trees display call flows or lists of messages, variables, records, and databases.

The GAP system supports the following trees: Call Plan tree, Message tree, and Data tree. The Call Plan tree displays the Call Plan nodes and their relationship to each other in a form that represents the call plan logic. That is, the different levels of the Call Plan tree show the call flow. The Messages trees show nodes that contain information about system and custom messages. The names of the nodes are used as values in Call Plan nodes. The Data tree displays nodes that describe variables, records, and databases. The levels of the Messages and Data trees list messages and data.

Each level of the trees contains one node, and each node contains properties that the user, the customer, or the system defines. Node properties provide information about profiles, such as database IDs and information on Takeback and Transfer (TNT) and audio talent.

Messages and Data nodes behave differently from Call Plan nodes. In general, Call Plan nodes have children (subnodes), and the levels indicate the logic of the call flow, while Messages and Data nodes do not have children, because the trees merely list and categorize the messages and data.

According to one embodiment of the present invention, the manner in which the node names are display convey information. For example, the names of properties that are required for saving and validation may be displayed in blue. Additionally, the names of properties that are required for validation only may be displayed in red. "Required" properties are required to the extent that the node is actually used in the profile. On all GAP trees, the selected node is highlighted in a color that depends on the user Windows settings. Nodes with missing required properties are highlighted in red. When the user enters a value for the Name and Parent Path Label properties, that value will be displayed on the tree when the user click the tree.

The users create and edit Profiles

The following properties are common to all Call Plan nodes: Name, Description, Parent Path Label, and Def Parent Path Label.

TABLE 14

| Node Name | Profile |
|---|---|
| Call Plan Tree: | |
| Action | x |
| Audio | x |
| Call | x |
| Call Profile | x |
| DB Lookup | x |
| Decision | x |
| Entry Point | x |
| Exit | x |
| Goto | x |
| Input | x |
| Jump | x |
| Menu | x |
| Target | x |
| Messages Tree: | |
| System Message | x |
| Custom Message | x |
| Data Tree: | |
| System Variable | x |
| Custom Variable | x |
| Record | x |
| Database | x |

Each node has a unique name, in which the user can assign the node names or use the default names. Node names are displayed in three places: next to the node on the tree, on top of the properties palette, and as the value for the Name property.

Each Call Plan node default name includes a node number that the system assigns automatically. The node number does not change when the user adds or deletes nodes. To the left of the name is the value for the Parent Path Label property or the Def Parent Path Label property. The labels describe the reason for the path. The name of the Entry Point node is different from other nodes; e.g., the first digit is a node ID and the last is a suffix.

Untyped nodes are placeholders in trees for adding named nodes. The user selects untyped nodes to create named nodes in Profiles. On the Call Plan tree, the user first selects a type of node on the node palette. The GAP Editor automatically creates untyped nodes as children of nodes that need child paths, such as Audio nodes. Some nodes, such as Jump, do not need children. The GAP Editor also automatically creates untyped nodes as the last System Message, Custom Message, Custom Variable, Record Data, and Database nodes in their trees. The user creates Profiles to describe complex application profiles.

Call Plan nodes specify the logic of an application, in which the call flow starts from a node to one of its children or from a Goto node to a Target node. All Call Plan nodes, except the Call Profile node, have one immediate parent. Child paths are labeled with a reason for the path. The paths depend on the type of parent node. Some exemplary default labels are listed in Table 15.

| Label | Used for children of node type: |
|---|---|
| Child's node ID | Call Profile |
| | Target |
| Next | Action |
| (next means success) | Audio |
| | Call |
| | Entry Point |
| | Input |
| | Target |
| rna (Ring No Answer) | Call |
| busy | Call |
| fail | Call |
| found | DB Lookup |
| not found | DB Lookup |
| else | Decision |
| InvKey | Input |
| | Menu |
| InvLen | Input |
| TimeOut | Input |
| | Menu |
| DTMF characters defined in Valid Keys property | Menu |
| Labels defined in ValueList property | Decision |

The Action node describes functions not covered by the other nodes: for example, manipulating data or calculating values (for example, <compute_day_of_week>, as shown in Table 16, below.

TABLE 16

| Property | Description |
|---|---|
| Name | Displays a unique name for the node. The user can change the name. It can be composed of alphanumeric characters, blanks, and !@#$%&*_-= A blank cannot be the first or last character.<br>Default: Action:nodeid |
| Description | Allows the user to explain the purpose of the Action node. The user should also explain any variables used, such as <calculate_day_of_week>. |
| TC Instructions | Allows the user to provide instructions to the builder that will not be displayed to the customer through TFNM. |
| Parent Path Label | Allows the user to enter a reason for the Action node. The label does not have to be unique. It can be composed of alphanumeric characters, blanks, and !@#$%&*_-= A blank cannot be the first or last character. |
| Def Parent Path Label | Displays a default reason for the Action node. Changing certain properties of the parent node may change the label.<br>Default: depends on the parent node. |
| Variable in Description | Allows the user to select any variables to be used in the Action node. Selecting the field displays a List of Variables Dialog box, where the user can select the variables. |

The Audio node defines messages to be played during a call; Table 17 shows the properties of this node.

TABLE 17

| Property | Description |
|---|---|
| Name | Displays a unique name for the node. The user can change the name. It can be composed of alphanumeric characters, blanks, and !@#$%&*_-= A blank cannot be the first or last character.<br>Default: Audio:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Audio node. The label does not have to be unique. It can be composed of alphanumeric characters, blanks, and !@#$%&*_-= A blank cannot be the first or last character. |
| Def Parent Path Label | Displays a default reason for the Audio node. Changing certain properties of the parent node may change the label.<br>Default: depends on the parent node. |
| Interrupt | Allows the user to specify whether the caller can stop an audio message by pressing DTMF keys.<br>Default: selected. |
| Repeat | Allows the user to specify whether the message will be played over and over again.<br>Default: not selected. |
| Messages | Allows the user to select the messages to be played. The order of the selections specifies the order of play. Selecting the field displays a List of Variables Dialog box, where the user makes the selections. |

The Call node specifies how to extend (transfer) a call and perform TNT. Table 18 lists the properties associated with the Call node.

TABLE 18

| Property | Description |
|---|---|
| Name | Displays a unique name for the node. The user can change the name. It can be composed of alphanumeric characters, blanks, and !@#$%&*_-= A blank cannot be the first or last character.<br>Default: Call:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Call node. The label does not have to be unique. It can be composed of alphanumeric characters, blanks, and !@#$%&*_-= A blank cannot be the first or last character. |
| Def Parent Path Label | Displays a default reason for the Call node. Changing certain properties of the parent node may change the label.<br>Default: depends on the parent node |
| Ring Time | BRNA only. Allows the user to specify the amount of time for the call to ring before taking the no-answer path.<br>Range: 12 to 120 seconds.<br>Required for save and validation.<br>Default: 36 seconds. |
| Number to Dial | Allows the user to enter the number to be dialed or specify a variable for the number. The number can be a DDD or IDDD (International Direct Distance Dialing) number, a route plan number, or the key for a DAP DB lookup. Selecting the field displays a Field Choice Dialog box, where the user can enter the number or select the variable.<br>Required for validation. |
| Dap DbId <*> | Allows the user to specify the ID of a DAP database to be used to extend the call. Selecting the field displays a Field Choice Dialog box, where the user select the database ID.<br>Required for validation if the Call Type property is DAP DB. |

TABLE 18-continued

| Property | Description |
| --- | --- |
| CourtesyMsg List | Allows the user to determine the message to be played to the caller during the outdial. The message is played and repeated until the call is answered, busy, or fails. Selecting the field displays a List of Variables Dialog box, where the user makes the selection.<br>If no courtesy or connection message is selected, the caller hears call progress tones. (If the user wants a courtesy message followed by call progress tones, use an Audio node for the courtesy message before the Call node.)<br>If no courtesy message is selected but a connection message is selected, a standard system message is played to the caller during outdial. |
| Call Type | Allows the user to select the type of call. Required for validation.<br>DDD    Direct Dialed Digits<br>Route Plan    Number that identifies a routing plan<br>DAP DB    Number to be looked up in a DAP database<br>Toll Free    800 or other toll free number<br>IDDD    International Direct Dialed Digit |
| Transfer Type <*> | TNT Enabled calls only. Allows the user to specify whether transfers from this Call node will be attended or unattended.<br>Required for validation if TNT Enabled is selected.<br>Attended    Transfer agent<br>Unattended    Blind transfer |
| Busy Ring NoAnswer | Allows the user to specify whether busy and RNA paths are needed.<br>Default: not selected. |
| Fail Path | Allows the user to specify whether a fail path is needed. From a customer's viewpoint, a call extension should not fail; it should be answered, not answered, or busy. An exception is when a caller enters digits to be directly dialed.<br>Default: not selected. |
| Announce Connection Msg List | Allows the user to determine the message to be played to the called party before the connection to the caller. Selecting the field displays a List of Variables Dialog box, where the user makes the selection. If no courtesy or connection message is selected, the caller hears call progress tones. |
| TNT Enabled | Allows the user to specify whether TNT is active for the call extension. When the user select TNT Enabled, a GUI List Editor and Choice Dialog box is displayed for entering the activation code list properties. TNT Enabled is selected automatically if the user defines activation codes.<br>Default: not selected. |
| Unlimited Transfer | TNT Enabled calls only. Allows the user to specify whether multiple transfers are allowed (whether the TNT activation codes remain in effect after the first transfer is complete). |
| Activation Code List <*> | TNT Enabled calls only. Allows the user to specify unique TNT activation codes for the call extension. Selecting the property field or selecting the TNT Enabled property displays a GUI List Editor and Choice Dialog box with the subproperties listed below.<br>Required for validation if TNT is selected.<br>Activation Code    Allows the user to enter the code to be used to activate TNT. The code must contain at least two unique characters.<br>Length: 5 DTMF characters max.<br>Required for validation.<br>Action    Allows the user to describe what will happen when the activation code is entered; for example, place caller on hold and transfer call.<br>Required for validation. |
| ActivationParty | Allows the user to select the party to be monitored for the activation code.<br>Caller: The person who placed the call.<br>Primary agent: Default. The party most recently bridged with the caller.<br>Secondary agent: Person helping the primary agent.<br>Required for validation. |

The Call Profile node is the root node (no parent) in the upper left of the Call Plan tree. The node defines properties that apply to the whole profile or profile set. The Call Profile node has at least one Entry Point child and one untyped child, and may have Target node children. All versions of a particular profile have the same SIS ID, application ID, corp ID, and application name. The Call Profile node properties are described in Table 19.

TABLE 19

| Property | Description |
| --- | --- |
| Name | Displays a unique name for the node. The user can change the name. It can be composed of alphanumeric characters, blanks, and !@#$%&*_-= A blank cannot be the first or last character.<br>Default: CallProfile:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the profile. The label does not have to be unique. It can be composed of alphanumeric characters, blanks, and !@#$%&*_-= A blank cannot be the first or last character. |
| Def Parent Path Label | Not used. |
| Version Name | Allows the user to describe the version. Length: 50 characters max. |
| Is Active | Allows the user to indicate whether this version of the profile corresponds to the application that is in production. Only one profile in a set can be active. The user should validate the profile version before activating it. |
| Is Validated | Indicates whether the profile version has been validated using the Validate command on the Tools menu. If a profile version has been validated and the user modify a property required for validation, the system will automatically change this property to indicate that it has not been validated. |
| TFNM Viewable | Allows the user to indicate whether this version of the profile can be viewed on TFNM. All active versions are automatically viewable by TFNM.<br>Default: not selected. |
| Changed Date | Automatically displays the date of the most recent save. |
| Changed Time | Automatically displays the time of the most recent save. |
| ASC ID | Allows the user to enter the GAP system user ID. Length: 20 characters max. |
| Customer Call Rec | Allows the user to specify any custom data (variable or record) to be generated when the call plan exits. (Customer call records are also called custom call records.) Selecting the field displays a List of Variables Dialog box, where the user can select a variable or record. |

TABLE 19-continued

| Property | Description |
| --- | --- |
| Version Number | Allows the user to assign a unique version number to the profile. The user should increment this value by 1 for each new version.<br>Range: 1-999,999.<br>Default: 1 for a new profile; for a changed profile, the highest number in the profile set plus 1.<br>Required for save and validation. |
| The following Profile Set properties automatically apply to every version of the profile: | |
| SIS ID | Allows the user to enter a unique ID for all versions of a particular profile set. SIS ID is used in the ASC Tracker system.<br>Required for save and validation. |
| APP ID | Allows the user to enter a unique ID for an application. The user can also change APP ID using the File menu Save command. If the user changes the APP ID, the user should also change the SIS ID.<br>Required for validation. |
| Corp ID | Allows the user to enter a unique ID for the customer who owns the application. The NetCap order entry system assigns the ID. The user can also change CorpID using the File menu Save command.<br>Required for validation. |
| APP Name | Allows the user to describe the application specified by this profile. The user can also change APP Name using the File menu Save command.<br>Required for save and validation. |
| Customer Name | Allows the user to enter the name of a customer contact for the application.<br>Required for validation. |
| Customer Phone Number | Allows the user to enter the phone number of the customer contact.<br>Required for validation. |
| Appl Status | Allows the user to indicate whether the application is being used by the customer.<br>Default: In Use<br>In Use — The application is being created or has been deployed. The profile is available in TFNM.<br>Disconnected — The application is no longer being used and is no longer available to the customer through TFNM. |

The DB Lookup node describes a database to be accessed during a call. The data returned from a lookup is stored in the Database node Data property (Data tree). Table 20 lists the properties of the DB Lookup node.

TABLE 20

| Property | Description |
| --- | --- |
| Name | Displays a unique name for the node. The user can change the name. It can be composed of alphanumeric characters, blanks, and !@#$%&*_-= A blank cannot be the first or last character.<br>Default: DbLookup:nodeid |
| Description | Allows the user to provide information about the node (such as its purpose). A network database lookup runs a stored procedure, and a HostConnect lookup needs a request ID. Specify the procedure name or the request ID in the Description property. |
| TC Instructions | Allows the user to provide instructions to the builder that will not be displayed to the customer. |
| Parent Path Label | Allows the user to enter a reason for the DB Lookup node. The label does not have to be |

TABLE 20-continued

| Property | Description |
| --- | --- |
| | unique. It can be composed of alphanumeric characters, blanks, and !@#$%&*_-= A blank cannot be the first or last character. |
| Def Parent Path Label | Displays a default reason for the DB Lookup node. Changing certain properties of the parent node may change the label.<br>Default: depends on the parent node. |
| Db Id | Allows the user to select the database to be searched. The database must be defined in a Database node on the Data tree. Selecting the field displays a Field Choice Dialog box, where the user makes the selection.<br>Required for save and validation. |
| Key | Allows the user to enter the key (or select a variable) to be used in a database search. Selecting the text box displays a Field Choice Dialog box, where the user enters a string for the key or select the record or variable.<br>Required for validation. |

The Decision node routes calls based on a user specified criteria. For example, the user could use time of day for the Criteria property, with 8 a.m. to 5 p.m. and 5 p.m. to 8 a.m. set in the ValueList property. If a call comes in during the day, one audio message would be played, and if the call comes in at night, another message would be played. Table 21 below shows other examples.

TABLE 21

| Criteria: | ValueList: |
| --- | --- |
| Day of week | Sunday<br>Monday through Friday<br>Saturday<br>Else |
| Account Balance <1000 | True<br>False<br>Else |
| <SurveyFlag> | Y<br>N<br>else |
| <Account Balance> | 0-1000<br>1001-10000<br>><rich><br>Else |

Table 22 shows the Decision node properties.

TABLE 22

| Property | Description |
| --- | --- |
| Name | Displays a unique name for the node. The user can change the name. It can be composed of alphanumeric characters, blanks, and !@#$%&*_-= A blank cannot be the first or last character.<br>Default: Decision:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Decision node. The label does not have to be unique. It can be composed of alphanumeric characters, blanks, and !@#$%&*_-= A blank cannot be the first or last character. |
| Def Parent Path Label | Displays a default reason for the Decision node. Changing certain properties of the parent node may change the label.<br>Default: depends on the parent node. |

TABLE 22-continued

| Property | Description |
| --- | --- |
| Criteria | Allows the user to enter a description of or select a variable for a condition to be used to direct the call flow. The criteria should correspond to the ValueList property.<br>Selecting the field displays a Field Choice Dialog box, where the user enters a string for the description or select the variable.<br>Required for validation. |
| Variable In Criteria | Allows the user to identify any variable references in the Criteria property. An example of Criteria using two variables is <account_balance> > <minimum_balance>.<br>Leave this property empty if the whole Criteria property is a variable or if it contains no variables. Selecting the field displays a List of Variables Dialog box, where the user can select the variables. |
| Value List | Allows the user to enter possible values for the decision criteria or select a variable for a value. Each value must be unique.<br>The criteria are compared to the values in the order shown in ValueList. The system automatically provides a child path for each value and an else path. If the user changes the parent path label for the child path, the system will keep that label when the user changes the value. The child path to be taken corresponds to the first value that matches the criteria.<br>Selecting the field displays a List of Variables Dialog box, where the user enters a string for a value or select a variable.<br>Required for validation. |

The Entry Point node indicates where the Call Plan starts or where another application can enter the call plan. The Entry Point node is always a child of the Call Profile node (root). Table 23 shows the properties of the Profile Entry Point node.

TABLE 23

| Property | Description |
| --- | --- |
| Name | Displays a unique name for the node. The user can change the name. It can be composed of alphanumeric characters, blanks, and !@#$%&*_-= A blank cannot be the first or last character.<br>Default: nodeid:Entry:suffix (for example, 1:Entry:2) |
| Description | Allows the user to provide information about the node such as its purpose. |
| TC Instructions | Allows the user to provide instructions to the builder that will not be displayed to the customer. |
| Parent Path Label | Allows the user to enter a reason for the Entry Point node. The label does not have to be unique. It can be composed of alphanumeric characters, blanks, and !@#$%&*_-= A blank cannot be the first or last character. |
| Def Parent Path Label | Displays a default reason for the Entry Point node. Changing certain properties of the parent node may change the label.<br>Default: depends on the parent node. |
| Suffix | Allows the user to enter an identifier for a possible starting point for a call flow or a jump to point.<br>Range: 0-999.<br>Required for save and validation.<br>Default: next available suffix (0 for the first Entry Point node in the tree). |
| Logical Termination | Allows the user to enter the logical termination associated with the entry point. |
| Parameters | Allows the user to select the variables that will hold parameters passed from the application that jumped to this application. There can be up to ten parameters. Selecting the field displays a List of Variables Dialog box, where the user can make the selections. |

The Exit node permits the call flow to leave the platform or end a call. The Exit node does not have any child nodes. Table 24 shows the properties of the Exit node.

TABLE 24

| Property | Description |
| --- | --- |
| Name | Displays a unique name for the node. The user can change the name. It can be composed of alphanumeric characters, blanks, and !@#$%&*_-= A blank cannot be the first or last character.<br>Default: Exit:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Exit node. The label does not have to be unique. It can be composed of alphanumeric characters, blanks, and !@#$%&*_-= A blank cannot be the first or last character. |
| Def Parent Path Label | Displays a default reason for the Exit node. Changing certain properties of the parent node may change the label.<br>Default: depends on the parent node. |

The Goto node reroutes control to a previously specified Target node and has no child nodes. The properties of the Goto node are shown in Table 25, below.

TABLE 25

| Property | Description |
| --- | --- |
| Name | Displays a unique name for the node. The user can change the name. It can be composed of alphanumeric characters, blanks, and !@#$%&*_-= A blank cannot be the first or last character.<br>Default: Goto:target_nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Goto node. The label does not have to be unique. It can be composed of alphanumeric characters, blanks, and !@#$%&*_-= A blank cannot be the first or last character. |
| Def Parent Path Label | Displays a default reason for the Goto node. The user cannot directly modify the label. Changing certain properties of the parent node may change the label.<br>Default: depends on the parent node. |
| Target Node | Allows the user to select the name of a previously defined Target node to go to.<br>Required for validation. |

The Input node collects DTMF or dial-pulse input from a caller or called party after an optional prompt. The Input node may be used to collect multiple-character inputs or as specified by a variable. Table 26 displays the input node properties.

TABLE 26

| Property | Description |
| --- | --- |
| Name | Displays a unique name for the node. The user can change the name. It can be composed of alphanumeric characters, blanks, and !@#$%&*_-= A blank cannot be the first or last character.<br>Default: Input:nodeid |
| Description | Allows the user to provide information about the node such as its purpose. |
| Technical Consultant (TC) Instructions | Allows the user to provide instructions to the builder that will not be displayed to the customer. |
| Parent Path Label | Allows the user to enter a reason for the Input node. The label does not have to be unique. It can be composed of alphanumeric characters, blanks, and !@#$%&*_-= A blank cannot be the first or last character. |
| Def Parent Path Label | Displays a default reason for the Input node. Changing certain properties of the parent node may change the label.<br>Default: depends on the parent node. |
| Interrupt | Allows the user to determine whether the caller can stop the prompt by pressing DTMF keys.<br>Default: selected. |
| Return Variable | Allows the user to select the variable that will hold the input. Selecting the field displays a Field Choice Dialog box, where the user makes the selection.<br>Required for validation. |
| Prompt Messages | Allows the user to select the prompt-for-input message. Selecting the field displays a List of Variables Dialog box, where the user can make the selection. |
| Time Out Messages | Allows the user to select the message to be played if the caller does not complete the input during the time out period. Selecting the field displays a List of Variables Dialog box, where the user can make the selections. |
| InvalidKey Msgs | Allows the user to select the message to be played if the DTMF received contains invalid characters (characters other than those defined in the Valid Keys property). Selecting the field displays a List of Variables Dialog box, where the user can make the selections. |
| Invalid Length Msgs | Allows the user to select the message to be played if the input received is outside the range specified by the Minimum Length and Maximum Length properties. Selecting the field displays a List of Variables Dialog box, where the user can make the selections. |
| Maximum Invalid | Allows the user to specify the maximum number of incorrect entries allowed.<br>Range: 0-10.<br>Required for save and validation.<br>Default: 3. |
| Maximum Time Outs | Allows the user to specify the maximum number of time outs allowed.<br>Range: 0-10.<br>Required for save and validation.<br>Default: 3. |
| Time Out | Allows the user to specify the maximum time to allow for complete input.<br>Range: 0-180.<br>Required for save and validation.<br>Default: 10 seconds. |
| Minimum Length | Allows the user to specify the minimum number of characters to be input. If the user wants to specify a particular number of characters, make the maximum length and minimum length the same.<br>Range: 1-100.<br>Required for save and validation.<br>Default: 2. |
| Maximum Length | Allows the user to specify the maximum number of characters to be input. If the user wants to specify a particular number of characters, the maximum length and minimum length are set to the same length.<br>Range: 1-100. |
| Valid Keys | Required for save and validation.<br>Default: 2.<br>Allows the user to specify the valid DTMF for this input. Duplicate DTMF is not allowed. The delimiter and escape characters cannot be the same as any of the Valid Keys characters.<br>Required for validation.<br>Default: 0123456789. |
| Delimiter | Allows the user to specify a single DTMF character that will end the input. The delimiter cannot be the same as the escape key (unless neither have been set) or any of the Valid Keys. |
| Escape | Allows the user to specify a single DTMF character that will replay the prompt (restart the input). The escape key cannot be the same as the delimiter (unless neither have been set) or any of the Valid Keys. |

The Jump node, which has no child nodes, passes control from one application to another. Table 27 shows the properties associated with this node.

TABLE 27

| Property | Description |
| --- | --- |
| Name | Displays a unique name for the node. The user can change the name. It can be composed of alphanumeric characters, blanks, and !@#$%&*_-= A blank cannot be the first or last character.<br>Default: Jump:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Jump node. The label does not have to be unique. It can be composed of alphanumeric characters, blanks, and !@#$%&*_-= A blank cannot be the first or last character. |
| Def Parent Path Label | Displays a default reason for the Jump node. Changing certain properties of the parent node may change the label.<br>Default: depends on the parent node. |
| Appl Id | Allows the user to enter the ID of the application to which the jump will take the call flow.<br>Required for validation. |
| Entry Point(Suffix) | Allows the user to identify the Entry Point node within another application where the call flow will continue after a jump.<br>Range: 0-999.<br>Required for validation.<br>Default: 0 |
| Parameters | Allows the user to specify the parameters (or variables) to be passed to the application being jumped to. Up to ten parameters are allowed. Selecting the field displays a List of Variables Dialog box, where the user can enter values or select variables for the parameters. |

The Menu node collects a single DTMF character or dial-pulse character from a caller or called party after an optional prompt. The properties of the Menu node are shown in Table 28.

TABLE 28

| Property | Description |
| --- | --- |
| Name | Displays a unique name for the node. The user can change the name. It can be composed of |

TABLE 28-continued

| Property | Description |
| --- | --- |
| | alphanumeric characters, blanks, and !@#$%&*_-= A blank cannot be the first or last character.<br>Default: Menu:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Menu node. The label does not have to be unique. It can be composed of alphanumeric characters, blanks, and !@#$%&*_-= A blank cannot be the first or last character. |
| Def Parent Path Label | Displays a default reason for the Menu node. Changing certain properties of the parent node may change the label.<br>Default: depends on the parent node. |
| Interrupt | Allows the user to determine whether the caller can stop the prompt by pressing DTMF keys.<br>Default: selected. |
| Maximum Time Outs | Allows the user to specify the maximum number of time outs allowed.<br>Range: 0-10.<br>Required for save and validation.<br>Default: 3. |
| Maximum Invalid | Allows the user to specify the maximum number of incorrect entries allowed.<br>Range: 0-10.<br>Required for save and validation.<br>Default: 3. |
| Time Out | Allows the user to specify the maximum time to allow for a complete input.<br>Range: 0-180 seconds.<br>Required for save and validation.<br>Default: 5 seconds. |
| Return Variable | Allows the user to select the variable that will hold the result of the input. Selecting the field displays a Field Choice Dialog box, where the user can make the selection. |
| Prompt Msgs | Allows the user to select the message to be played asking for input. Selecting the field displays a List of Variables Dialog box, where the user can make the selections. |
| Timeout Msgs | Allows the user to select the message to be played if the caller does not complete the input during the time out period. Selecting the field displays a List of Variables Dialog box, where the user can make the selections. |
| Invalid Messages | Allows the user to select the message to be played if DTMF received contains characters other then those defined in the Valid Keys property. Selecting the field displays a List of Variables Dialog box, where the user can make the selections. |
| Valid Keys | Allows the user to specify the valid DTMF (0123456789*#) for this input. The system automatically provides a child path for each valid key. Duplicate DTMF is not allowed.<br>Required for validation.<br>Default: 12 (valid keys are 1 and 2). |

The Target node provides the location to which a Goto node moves to continue the call flow. Table 29 lists the properties of the Target node.

TABLE 29

| Property | Description |
| --- | --- |
| Name | Displays a unique name for the node. The user can change the name. It can be composed of alphanumeric characters, blanks, and !@#$%&*_-= A blank cannot be the first or last character.<br>The name of this node usually describes a part of |

TABLE 29-continued

| Property | Description |
| --- | --- |
| | an application, such as Technical Services Submenu (Target followed by Menu node), Final Thank you (Target followed by Audio node followed by Exit node), or Main Menu. Use the name to define the destination of a Goto node.<br>Default: Target:nodeid |
| Description | Allows the user to provide information about the node such as its purpose. |
| TC Instructions | Allows the user to provide instructions to the builder that will not be displayed to the customer. |
| Parent Path Label | Allows the user to enter a reason for the Target node. The label does not have to be unique. It can be composed of alphanumeric characters, blanks, and !@#$%&*_-= A blank cannot be the first or last character. |
| Def Parent Path Label | Displays a default reason for the Target node Changing certain properties of the parent node may change the label.<br>Default: depends on the parent node. |

Message nodes define messages that will be played to a caller or called party. In a typical single-language application, each message node contains one message. In a typical multi-language application, each message node contains a message for each language used. The user cannot delete from the Messages tree a message that is used in the Call Plan tree. All references in the Call Plan tree to message names are updated automatically when the user changes the name of the message.

The GAP system provides predefined messages. In an exemplary embodiment, the user can delete system messages from the Messages tree, but they are not be deleted from the GAP system. Table 30 shows the properties of the Profile System Message node.

TABLE 30

| Property | Description |
| --- | --- |
| Name | Predefined. Displays a unique name for the message. |
| Number | Predefined. Provides a unique identifier for the system message. Call Plan nodes refer to messages by the message number. |
| Remote Updatable | Not used |
| Tone | Predefined. |
| Messages | Allows the user to identify different versions of the audio. Selecting the field displays a GUI List Editor and Choice Dialog box, where the user view the subproperties: |
| HasAudio Changed | Not used. |
| Text | Predefined. Displays the actual message text. |
| AudioFile Name | Not used. |
| Talent | Predefined. Indicates the type of voice used to record the message. Talent and Talent ID are unique within the message set. The Talent ID of system messages is not relevant to customers.<br>Required for validation.<br>Default: the last talent entered in the set or U.S. English/Female.<br><br>Talent — Talent ID<br>U.S. English — 0<br>U.S. English/Male — 1<br>U.S. English/ — 2 |

TABLE 30-continued

| Property | Description | |
|---|---|---|
| | Female Canadian | 3 |
| | Canadian/Male | 4 |
| | Canadian/Female | 5 |
| | Unspecified | 99 |

The user can use the GAP Editor to define the customized messages. Table 31 shows the properties associated with the Message node.

TABLE 31

| Property | Description |
|---|---|
| Name | Allows the user to enter a unique name for the message, such as Greeting. Default: mn, where n is a number (for example, m1) The default name for a new message increases by 1 no matter what the other messages are named. |
| Number | Allows the user to provide a unique identifier for the custom message. The user cannot change the number if it is used in a Call Plan node. Call Plan nodes refer to messages by the message number. Default: next available custom message number. Required for save and validation. |
| Remote Updatable | Allows the user to specify whether the customer can update a custom message remotely. Default: not selected. |
| Tone | Allows the user to indicate the tone of voice for the message (for example, business). Length: 10 characters max. |
| Messages | Allows the user to identify different versions of the audio. Selecting the field displays a GUI List Editor and Choice Dialog box, where the user defines subproperties. Required for validation. |
| HasAudio Changed | Indicates whether this message contains new audio uploaded by the ASC or a TFNM customer. |
| Text | Allows the user to enter the actual message text. |
| AudioFile Name | Specifies the path and file name of any audio file that has been uploaded into the AudioData property. Length: 200 characters max. |
| Talent | Allow the user to indicate the type of voice used to record the message. Talent and Talent ID must be unique within the message set. Talent ID is associated with the talent used to record the message; it is not relevant to customers. The user cannot change Talent if it is used in a Call Plan node. Required for validation. Default: the last talent entered in the set or U.S. English/Female. |

| Talent | Talent ID |
|---|---|
| U.S. English | 0 |
| U.S. English/Male | 1 |
| U.S. English/Female | 2 |
| Canadian | 3 |
| Canadian/Male | 4 |
| Canadian/Female | 5 |
| Unspecified | 99 |

Data nodes define profile variables, records, and databases that the user utilizes in the Call Plan tree. The user cannot delete from the Data tree a variable, record, or database that is used in the Call Plan tree. All references in the Call Plan tree to data names are updated automatically when the user changes the name of the node. Variable, record, record field, database, and database field names must be unique within a profile.

Variable nodes describe a single value such as a number or character string. For example, the user can define a custom variable to hold the extension number a caller dials. Variables do not have defined data types, such as integer. A reference to a variable within a Call Plan node is enclosed in angle brackets; for example, <DOW>, <day_of_week>.

New Profiles automatically provide the following system variables, as shown in Table 32.

TABLE 32

| Variable: | Description: |
|---|---|
| Caller Number | Contains the caller's phone number (Automatic Number Identification (ANI)) at the time the application is running. Length: 20 characters max. |
| Dialed Number | Contains the phone number dialed by the caller (Dialed Number Identification Service (DNIS)) at the time the application is running. Length: 20 characters max. |
| Talent | Describes the talent used for a message if no other talent has been specified. Length: 30 characters max. Default: U.S. English/Female |

Tables 33 and 34 list the properties of a system variable node and a custom variable node, respectively.

TABLE 33

| Property | Description |
|---|---|
| Name | Predefined. Displays the name of the variable the user selected. |
| Description | Predefined. Describes the meaning or use of the variable. |
| Initial Value | Predefined. Displays the value the variable will have at the beginning of the call flow. |
| Length <*> | Predefined. Specifies the number of characters in the variable. |

TABLE 34

| Property | Description |
|---|---|
| Name | Displays a unique name for the variable. The user can change the name. Custom variable names cannot begin with sys. The name can be composed of alphanumeric characters, blanks, and !@#$%&*_-= A blank cannot be the first or last character. Default: Cn, where n is a number (for example, C1) Required for save and validation. |
| Description | Allows the user to describe the meaning or use of the variable. Length: 255 characters max. |
| Initial Value | Allows the user to define the value the variable will have at the beginning of the call flow Length: 1932 characters max. |
| Length <*> | Specifies the number of characters in the variable. Range: 1-1932. |

A Record node describes a storage location that can hold multiple values. Record nodes may describe customer call records. A Record node could also hold, for example, customer information; e.g., name, social security number (SSN), and account number. A reference to a record within a Call Plan node is enclosed in angle brackets, and the record name is separated from the field name by a period; for example, <customer_record.account_#>. Table 35 lists the properties of the Recode node.

TABLE 35

| Property | Description |
|---|---|
| Name | Displays a unique name for the record node. The user can change the name. The name can be composed of alphanumeric characters, blanks, and !@#$%&*_-= A blank cannot be the first or last character.<br>Default: Rn, where n is a number (for example, R1)<br>Required for save and validation. |
| Description | Allows the user to describe the meaning or use of the record.<br>Length: 255 characters max. |
| Fields | Allows the user to define variables for the fields in the record. Define the fields in the order in which they appear in the record.<br>Selecting the Fields field displays a GUI List Editor and Choice Dialog box where the user specify the fields.<br>Required for validation.<br>Name — Displays a unique name for the variable. The user can change the name (same restrictions as the Record node Name property above.)<br>Default: RecVarn, where n is a number (for example, RecVar1)<br>Required for save and validation.<br>Description — Allows the user to describe the meaning or use of the variable.<br>Length: 255 characters max<br>InitialValue — Allows the user to define the initial value of the variable.<br>Range: 1-1932 characters.<br>Default: 1<br>Length <*> — Allows the user to define the number of characters in the field. The user should change the value from the default.<br>Range: 1-1932 characters.<br>Default: 0 |

A Database node describes a database that is used in an application. The values depend on the type of database. A reference to a database within a DB Lookup node on the Call Plan tree is enclosed in angle brackets, and the database name is separated from the field name by a period; for example, <DB1.acct>. Table 36 lists the properties associated with the Database node.

TABLE 36

| Property | Description |
|---|---|
| Name | Displays a unique name (ID) for the Database node. The user can change the name. The name can be composed of alphanumeric characters, blanks, and !@#$%&*_-= A blank cannot be the first or last character.<br>Default: Dn, where n is a number (for example, D1)<br>Required for save and validation. |
| Description | Allows the user to describe the purpose or use of the database.<br>Length: 255 characters max. |
| DB Change Date <*> | Allows the user to enter the date and time the database was last modified (or was created) in production. Selecting the field displays the Date Selection Dialog box, where the user specifies the date.<br>Required for validation for LDBs. |
| Asc File Name | Uploaded LDBs only. Allows the user to enter the path and file name of an LDB file that the ASC has loaded into the Data property.<br>Length: 200 characters max. |
| Cust File Name | Uploaded LDBs only. Allows the user to enter the path and file name of the LDB file that a customer has loaded into the Data property.<br>Length: 200 characters max. |
| Verify Length | LDBs only. Allows the user to indicate whether the customer wants the length of the field values in the Data property to be verified.<br>If so, the length of each value excluding leading and trailing blanks must equal the length specified in the Key Structure or Data Structure property. (If not, the length of each value excluding trailing blanks must be less than or equal to the length specified.)<br>Default: not selected. |
| LDB ID <*> | LDBs Only. Allows the user to specify the database number (ID) of the local database loaded in the NGSN application.<br>Required for validation. |
| DbType | Allows the user to select the type of database.<br>Required for validation.<br>DAP — Data Access Point<br>LDB — Local Database<br>HC — HostConnect<br>NDB — Network Database |
| LookupType <*> | LDBs only. Allows the user to select the type of search method to be used.<br>Required for save if the Data property is populated.<br>Direct — Specifies a search for an exact key match.<br>Range — Specifies a search for a key between two values (inclusive). |
| Key Structure <*> | Allows the user to specify variables for the keys available for a database lookup. Specify the keys in the order in which they are concatenated in the database. One key is required for an LDB with a direct lookup, and two keys are required for an LDB with a range lookup. Key values must be unique (overlapping ranges are allowed but duplicate ranges are not).<br>Selecting the property field displays a GUI List Editor and Choice box with the subproperties listed below.<br>Required for save if the Data property is populated.<br>Required for validation for HostConnect databases.<br>Name — Displays a unique name for the key. The pipe character (\|) is not allowed. The user can change the name (same restrictions as Database node Name property above).<br>Default: DbVarn, where n is a number (for example, DbVar1).<br>Required for save and validation.<br>Description — Allows the user to describe the meaning or use of the key.<br>Length 255 characters max.<br>Initial Value — Allows the user to define the initial value for the key.<br>Length <*> — Allows the user to define the number of characters in the key. The user should change the value from the default.<br>Range: 1-1932<br>Default: 0.<br>Required for save and validation. |

TABLE 36-continued

| Property | Description |
| --- | --- |
| Data Structure <*> | Allows the user to specify variables for the fields returned from the database. Specify the fields in the order in which they are concatenated in the database.<br>Selecting the property field displays a GUI List Editor and Choice Dialog box with the subproperties listed below.<br>Required for save if the Data property is populated.<br>Required for validation for HostConnect databases.<br>   Name        Displays a unique name for the variable. The user can change the name (same restrictions as Database node Name property above).<br>                  Default: DbVarn, where n is a number (for example, DbVar2).<br>                  Required for save and validation.<br>   Description  Allows the user to describe the meaning or use of the variable.<br>                  Length: 255 max.<br>   Initial Value  Allows the user to define the initial value of the variable.<br>   Length <*>  Allows the user to define the number of characters in the field. The user should change the value from the default.<br>                  Range: 1-1932.<br>                  Default: 0<br>                  Required for save and validation. |
| Data | LDBs only. Displays the actual contents of a local database. The pipe character (\|) is not allowed. Each key must be unique. Each field must be populated. Selecting the field may display the Edit LDB Errors window. Once the user fix the errors, selecting the field displays the LDB Data Editor dialog box, where the user can edit the contents of the LDB.<br>Length: 32,768 ASCII characters max.<br>Required for validation for LDBs. |

The customers may create various application profiles Child paths are labeled with a reason for the path; in which the paths depend on the type of parent node. The default labels are listed below Table 37.

TABLE 37

| Label | Used for children of node type: |
| --- | --- |
| Child's node ID | Call Profile |
| Next | Audio |
| (next means success) | Call |
| | Entry Point |
| Rna | Call |
| Busy | Call |
| Fail | Call |
| InvKey | Menu |
| TimeOut | Menu |
| DTMF characters defined in Valid property | Menu Keys |

The Audio node defines messages to be played during a call and exhibit the properties enumerated in Table 38.

TABLE 38

| Property | Description |
| --- | --- |
| Name | Displays a unique name for the node. |
| Description | Provides information about the node such as its purpose. |

TABLE 38-continued

| Property | Description |
| --- | --- |
| Parent Path Label | Displays a reason for the Audio node entered by the customer. |
| Def Parent Path Label | Displays a default reason for the Audio node. |
| Interrupt | Specifies whether the caller can stop an audio message by pressing DTMF keys.<br>Default: not selected. |
| Repeat | Specifies whether the message will be played over and over again.<br>Default: not selected. |
| Messages | Displays the messages to be played. The order of the messages specifies the order of play. |

The Call node specifies how to extend (transfer) a call and perform TNT. Table 39 lists the properties of this node.

TABLE 39

| Property | Description |
| --- | --- |
| Name | Displays a unique name for the node. |
| Description | Provides information about the node such as its purpose. |
| Parent Path Label | Displays a reason for the Call node entered by the customer. |
| Def Parent Path Label | Displays a default reason for the Call node. |
| Ring Time | Specifies the amount of time for the call to ring before taking the no-answer path. |
| Number to Dial | Displays the DDD or IDDD number to be dialed. |
| Courtesy Msg List | Determines the message to be played to the caller during the outdial. The message is played and repeated until the call is answered, busy, or fails. If no courtesy or connection message is selected, the caller hears call progress tones. If no courtesy message is selected but a connection message is selected, a standard system message is played to the caller during outdial. |
| Transfer Type | Specifies whether transfers from this call node will be attended or unattended.<br>  Attended       Transfer agent<br>  Unattended    Blind transfer |
| Busy Ring NoAnswer | Specifies whether busy and RNA paths are needed. |
| Connection Msgs List | Determines the message to be played to the called party before the connection to the caller. If no courtesy or connection message is selected, the caller hears call progress tones. |
| GBTB Code | Specifies the giveback/takeback code, a two-digit input string that will break the bridge and exit the call on the next path. |
| Transfer Code | Specifies the 2-character DTMF code that will break the bridge to start a transfer. |
| Transfer Hold Message | Determines the message to be played to the caller after the transfer code is entered and the caller has been placed on hold. The message is played and repeated until the call is answered, busy, or fails. If the transfer type is unattended and no transfer hold message is specified, the caller hears call progress tones. |
| Transfer Agent Prompt | Specifies the message to be played to the agent after the transfer code is entered and the caller is placed on hold. |
| Destinations | Specifies one or more outdial destinations based on input from the agent transferring the call.<br>  Outdial key     The key associated with an outdial number.<br>  Outdial number  A DDD or IDDD number to be dialed to transfer a call. |

The Call Profile node is the root node (no parent) in the upper left of the Call Plan tree. The node defines properties that apply to the whole profile or profile set. The Call Profile node always has one Entry Point child and one untyped child. Table 40 shows the properties of the call profile node.

TABLE 40

| Property | Description |
| --- | --- |
| Name | Displays a unique name for the node. |
| Description | Provides information about the node such as its purpose. Base profile information should be part of the description to allow the user to determine required application changes. |
| Parent Path Label | Displays a reason for the profile. |
| Def Parent Path Label | Not used. |
| Version Number | Displays a unique version number for the profile. |
| Version Name | Displays a description of the version. |
| Is Active | Indicates whether this version of the profile corresponds to the application that is in production. The profile must be validated to be active. Only one profile in a set can be active. |
| Is Validated | Indicates whether the profile version has been validated. |
| TFNM Viewable | Indicates that the profile can be viewed on TFNM. |
| Changed Date | Displays the date of the most recent save. |
| Changed Time | Displays the time of the most recent save. |
| ASC ID | Displays the GAP system user ID. |
| The following Profile Set properties automatically apply to every version of the profile: | |
| SIS ID | Displays a unique ID for all versions of a particular profile set. The user can add a SIS ID if it is missing or change it using the File menu Save command. The SIS ID is not meaningful to customers. |
| APP ID | Displays a unique ID for an application. |
| Corp ID | Displays a unique ID for the customer who owns the application. The NetCap order entry system assigns the ID. |
| APP Name | Describes the application specified by this profile. |
| Customer Name | Displays the name of a customer contact for the application. |
| Customer Phone Number | Displays the phone number of the customer contact. |
| Appl Status | Indicates whether the application is still being used by the customer. Appl Status cannot be viewed on TFNM. |
|    InUse | The application is being created or has been deployed. |
|    Disconnected | The application is no longer being used and is no longer available to the customer through TFNM |

The Entry Point node indicates where the Call Plan starts and is always a child of the Call Profile node (root). The properties of this node are listed below in Table 41.

TABLE 41

| Property | Description |
| --- | --- |
| Name | Displays a unique name for the node. |
| Description | Provides information about the node such as its purpose. |
| Parent Path Label | Displays a reason for the Entry Point node entered by the customer |
| Def Parent Path Label | Displays a default reason for the Entry Point node. |
| Suffix | Displays an identifier for the starting point for a call flow. |
| Logical Termination | Displays the logical termination associated with the entry point. |

The Exit node provides a point where the call flow leaves the platform or ends a call. The Exit node does not have any child nodes. Table 42 lists the properties of the Exit node.

TABLE 42

| Property | Description |
| --- | --- |
| Name | Displays a unique name for the node. |
| Description | Provides information about the node such as its purpose. |
| Parent Path Label | Displays a reason for the Exit node entered by the customer. |
| Def Parent Path Label | Displays a default reason for the Exit node. |

The Menu node collects a single DTMF character or dial-pulse character from a caller or called party after an optional prompt. Table 43 provides descriptions of the properties of the Menu node.

TABLE 43

| Property | Description |
| --- | --- |
| Name | Displays a unique name for the node. |
| Description | Provides information about the node such as its purpose. |
| Parent Path Label | Displays a reason for the Menu node entered by the customer. |
| Def Parent Path Label | Displays a default reason for the Menu node. |
| Interrupt | Determines whether the caller can stop the prompt by pressing DTMF keys. |
| Maximum Time Outs | Specifies the maximum number of time outs allowed. |
| Maximum Invalid | Specifies the maximum number of incorrect entries allowed. |
| Time Out | Specifies the maximum time to allow for a complete input. |
| Prompt Msgs | Displays the message to be played asking for input. |
| Timeout Msgs | Displays the message to be played if the caller does not complete the input during the time out period. |
| Invalid Messages | Displays the message to be played if the DTMF received contains characters other then those defined in the Valid Keys property. |
| Valid Keys | Specifies the valid DTMF for this input. |

Message nodes define messages that will be played to a caller or called party. The GAP system provides predefined messages with the system message node, which has properties shown in Table 44.

TABLE 44

| Property | Description |
| --- | --- |
| Name | Predefined. Displays a unique name for the message. |
| Number | Predefined. Provides a unique identifier for the System message. Call Plan nodes refer to messages by the message number. |
| Remote Updatable | Not used. |
| Tone | Predefined. |
| Messages | Identifies different versions of the audio. Selecting the field displays a GUI List Editor and Choice Dialog box, where details about the message are displayed: |
|    HasAudio Changed | Not used. |
|    Text | Predefined. Displays the actual message text. |
|    AudioFileName | Not used. |
|    Talent | Predefined. Indicates the type of voice used to record the message. The Talent ID of system messages is not relevant to customers |

TABLE 44-continued

| Property | Description | | |
|---|---|---|---|
| | | Talent | Talent ID |
| | | U.S. English | 0 |
| | | U.S. English/Male | 1 |
| | | U.S. English/Female | 2 |
| | | Canadian | 3 |
| | | Canadian/Male | 4 |
| | | Canadian/Female | 5 |
| | | Unspecified | 99 |

The customers can use the GAP Editor to define their own messages using the custom message node. Table 45 lists the customer message node properties.

TABLE 45

| Property | Description | | |
|---|---|---|---|
| Name | Displays a unique name for the message, such as Greeting. | | |
| Number | Provides a unique identifier for the message. Call Plan nodes refer to messages by the message number. | | |
| Remote Updatable | Determines whether the customer can update a custom message remotely. | | |
| Tone | Indicates the tone of voice for the message (for example, business). | | |
| Messages | Identifies different versions of the audio. | | |
| | HasAudio Changed | Indicates whether this message contains new audio uploaded by the ASC or a TFNM customer. | |
| | Text | Displays the actual message text. | |
| | AudioFileName | Specifies the path and file name of any audio file that has been loaded into this profile. | |
| | Talent | Indicates the type of voice used to record the message. | |
| | | Talent | Talent ID |
| | | U.S. English | 0 |
| | | U.S. English/Male | 1 |
| | | U.S. English/Female | 2 |
| | | Canadian | 3 |
| | | Canadian/Male | 4 |
| | | Canadian/Female | 5 |
| | | Unspecified | 99 |

The GAP Editor provides File, Edit, View, Tools, and Window menus for working with profiles. The File menu commands are listed below in Table 46.

TABLE 47

| Command | Description |
|---|---|
| New | Creates a new Profile. The GAP system will prompt the user to save any modified profile in the window before creating a new one. |
| Open | Displays an existing profile. The user can have more than one profile open at the same time in different windows. This allows the user to have base and updated profiles opened to see what changes need to be made in the application. The user can select the profile version from a list or specify one of the following:<br>SIS ID and profile version<br>Application ID and profile version<br>Application ID only for the active version<br>The GAP system will prompt the user to save any modified profiles in the window before opening another one. |

TABLE 47-continued

| Command | Description |
|---|---|
| Close | Shuts the profile. The GAP system will warn the user if the user try to close with unsaved changes. |
| Save | Stores changes to the profile. The user is prompted to complete any required fields that have not been filled in. The user will then be prompted with the version number, SIS ID, corp ID, application ID, and application name. The user cannot save changes to an active profile unless the user revalidate it first or make it inactive.<br>The system will warn the user if the user try to save with changes to properties associated with a profile set (such as SIS ID) or if the user saves an inactive profile that would overwrite the active profile.<br>If the user changes the version number here, the user should increment it by 1. |
| Change SIS ID | Changes the system ID of a profile set. The user should also change the application ID in the Call Profile node. The user need not save for the change to take effect.<br>The SIS ID length is 8 characters. The first character must be an alpha character. |
| Change APP ID | Changes the application ID of a profile set. The application ID is seven digits long. The user need not save for the change to take effect. |

The user may invoke the commands in the Edit menu to work with Profile trees and with audio and LDB data; these commands are listed below in Table 48.

TABLE 48

| Command | Description |
|---|---|
| Undo Node Insertion | Removes the most recent change to a tree. There is one level of Undo. |
| Cut Node | Removes a node and its children from a Call Profile tree and places them in temporary memory. The user cannot cut the Call Profile node or the first Entry Point node. |
| Copy Node | Duplicates a Call Plan node and its children and places them in temporary memory. |
| Paste Node | Puts a cut or copied Call Plan node and its immediate children on the selected untyped node in the same profile. The name of the nodes will be changed automatically. (Node names must be unique.) |
| Delete Node/Branch | Removes the selected node and its children. The user is prompted to confirm the deletion. When the user delete, an untyped node remains at the deletion point. |
| Paste LDB Data | Puts LDB data copied from the order into the Database node Data property. |
| Paste Audio Message Data | DP only. Puts audio copied from the order into the Custom Message node AudioData property. |
| Import LDB Data | DP only. Uploads LDB data from the ASC PC to the GAP system. The system will warn the user if data has already been uploaded; that is, if the Database node Data property is populated. |
| Export LDB Data | Downloads LDB data from the GAP system (DB node Data property) to the ASC PC. |

The View menu is used to change the display of the GAP Editor; the associated commands are listed in Table 49.

TABLE 49

| Command | Description |
|---|---|
| Expand All | Call Plan tree only. Displays the whole tree. |
| Collapse All | Call Plan tree only. Displays only the first level nodes. |

TABLE 49-continued

| Command | Description |
| --- | --- |
| Node Palette | Turns the display of the Call Plan node palette on and off.<br>Default: on |
| Node Properties/<br>Values | Turns the display of the Properties Palette on and off.<br>Default: on |
| Status Bar | Turns the display of the Status Bar on and off.<br>Default: on |

The use of the Tools menu ensures that a profile is complete, making the profile available to TFNM. Table 50 provides the commands that are associated with the Tools menu.

TABLE 50

| Command | Description |
| --- | --- |
| Validate | Checks the profile for errors and displays the results. |
| Set Active | Makes the profile available for viewing through TFNM and triggers the provisioning process. (The profile must be validated and saved first.) Only one profile version can be active at a time. An order is not needed to activate a profile. |
| Set InActive | Makes the profile unavailable for viewing through TFNM. (The profile must be saved first.) |

The Window menu provides the capability to open and select order and profile windows. The commands that are provided by the Window menu are shown in Table 51.

TABLE 51

| Command | Description |
| --- | --- |
| New Order Window | Opens the Order Editor. The user can open more than one at the same time. |
| New Call Profile Window | Opens the GAP Editor. The user can open more than one at the same time. |
| List Windows | Lists all open GAP system windows for the user to select for viewing. |

To define a Profile, the user specifies the call flow logic, the messages, and the databases. The user may click on the Messages and Data tabs to define messages and data (variables, records, and databases); this process is more fully described below. Once defined, the messages and data are available for use in the Call Plan tree. The Call Plan tab 705 provides a display the call flow.

To create a new node, the user makes a selection on the node palette, then selects an untyped node on the Call Plan tree. The system changes the untyped node to the node type that is selected. The system also creates untyped nodes for each new child path (subnode). If an untyped node is not available, the user may cut (via the cut and paste function) an existing node; an untyped node will be created in its place. The user can paste the cut node into an untyped child of the new node and fill in the properties for the nodes.

When the user changes a Call Plan property that creates new child paths, an untyped node is automatically created for each path. Also, when the user changes a Call Plan property that deletes child paths, nodes on the tree are deleted. The user is prompted to confirm, unless the node is untyped. When the user has completed the trees and has filled in the properties, the GAP system proceeds to validate the Profile, as more fully described below.

The user can change the SIS ID or the application ID in a Profile. The user need not save the Profile or the order for the change to take effect. The GAP system 103 provides for the capability to change the SIS ID and the Application ID. The user can use predefined system messages or customize the messages. Once the messages are defined, they will be available for use in the Call Plan tree.

System messages may be selected by the user by opening a DP, in which the Messages tab provides a display of the Messages tree. On the Messages tree, the System Messages may be expanded to show the Untyped System MessageSet. Upon selecting on the Untyped System MessageSet, a Message Selection Dialog box is displayed such that the user may select a system message or enter a message number in the Messages field. The system 103 creates a new System Message node and displays its predefined properties. The subproperties may be displayed by selecting on the Messages field. Custom messages may be defined in a similar manner. Specifically, on the Messages tree, the user may expand the Custom Messages to display Untyped Custom MessageSet.

Audio data for custom messages are provided by the TFNM 105. Modify orders can contain audio data. In an exemplary embodiment, the audio format is ADPCM (Adaptive Differential Pulse Code Modulation) 32 format.

The user can copy the audio file name and message text from an order to a Profile Custom Message node, based on the message number and talent ID. The message number and talent in the order and the Profile must match. The user can download audio files from the GAP system to the PC of the user for deployment to provisioning. The profile does not have to be open to export audio.

The user can define variables for Profiles, either using predefined system variables or custom variables. Once created, the variables are available for use in the Call Plan tree. The GAP system 103 provides three predefined system variables: caller number, dialed number, and talent. The user may select the Data tab to display the Data tree, which may be expanded to permit selection of system variables or custom variables. Some node properties require the user to fill out one of the dialog boxes described below.

Figure 8A:
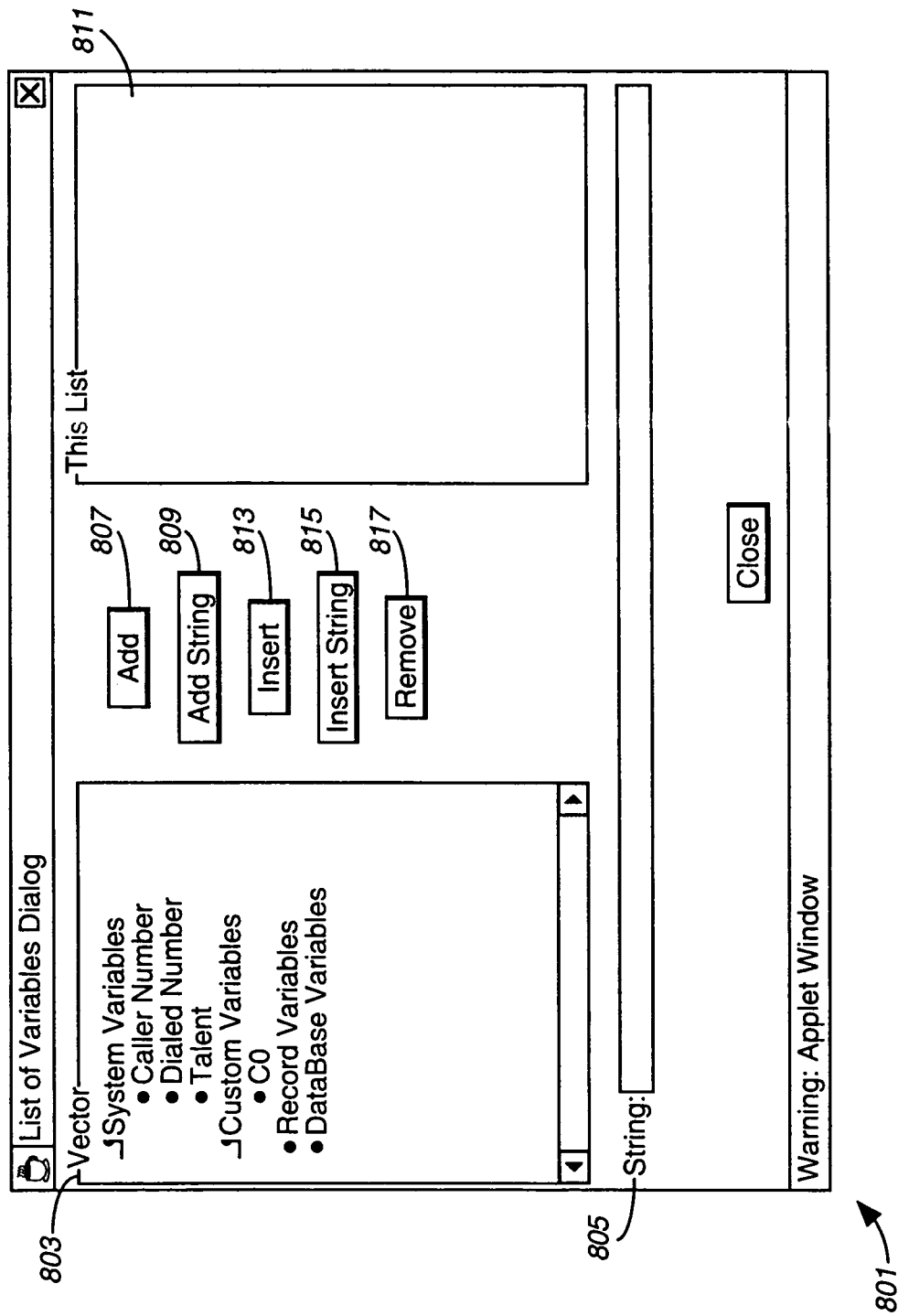
FIGS. 8A and 8B are diagrams of a list of variables dialog box screen and a field choice dialog box screen, respectively, of the GUI supported by the GAP system of FIGS. 1A and 1B.
Figure 8B:
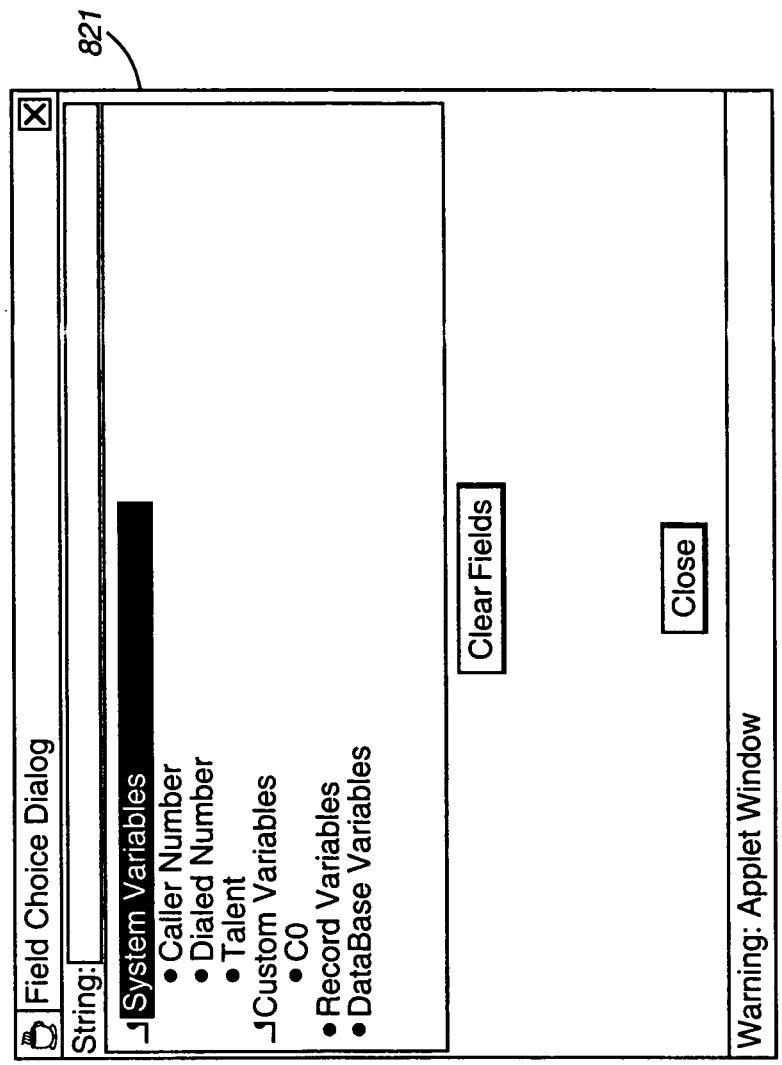

FIGS. 8A and 8B are diagrams of a list of variables dialog box screen and a field choice dialog box screen, respectively, of the GUI supported by the GAP system of FIGS. 1A and 1B. Upon selecting some Call Plan property fields, the user is provided with a display of a List of Variables Dialog box 801. FIG. 8A is a sample List of Variables Dialog box. The buttons and selections vary depending on the property. The dialog box 801 permits the entry and selection of multiple variables or messages. The system then fills in the property field with the user entries and selections.

The user may fill in the List of Variables Dialog box 801 as follows. The user may select a folder icon in the Vector area 803 to view the available selections. Next, the user makes a selection in the Vector area 803 or enters a value into the String field 805. The user then clicks the Add (vector) button 807 or Add String button 809; the variable or message is added to the This List area 811. The order of entries in This List area 811 is significant. To put a variable or message in a particular place, the user selects an entry in the This List area 811. The user selects a variable or message or enters a value into the String field. The user next clicks the Insert (vector) or Insert String button. The new variable or message is added above the selection in the This List area 811. The above process is repeated for as many variables and messages as the user seeks to specify. The user may click on the Exit button, when the This List area 811 contains all required variables or messages. The dialog box 801 also includes an Insert button 813, which places the Vector selection above the This List selection. An Insert String button 815 is provided to place the string entry into the This List area 811. Further, a Remove button 817 provides for the deletion of a selection from the This List area 817.

By selecting on a Call Plan property field, a Field Choice Dialog box 821 is displayed. This dialog box 821 is used to enter or select a single variable. The system 103 then fills in the property field with the user entry or selection. It is noted that the selections that are displayed vary depending on the property.

Figure 9:
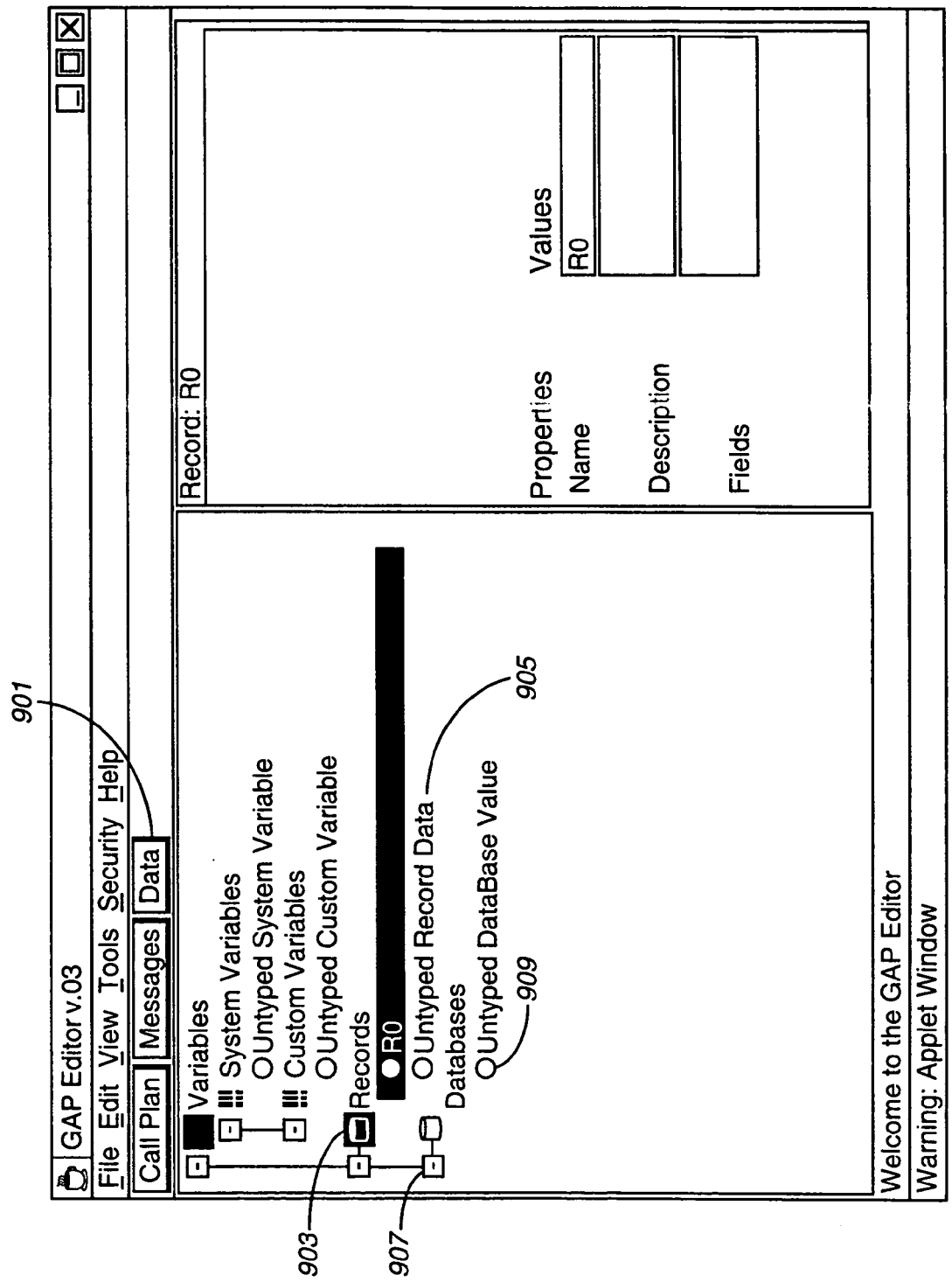
FIG. 9 is a diagram of a call plan screen, which permits the creation of records, according to the GUI supported by the GAP system of FIGS. 1A and 1B.

FIG. 9 is a diagram of a call plan screen, which permits the creation of records, according to the GUI supported by the GAP system of FIGS. 1A and 1B. The GAP system 103 also permits the user to define records for the Profiles. Record properties are further described below. Once they are defined, the records are available for use in the Call Plan tree. To define records, the user clicks on the Data tab 901 to display the Data tree; at which point the user may expand the Records 903 to display Untyped Record Data 905. The system accordingly creates a new Record node. The user then fills in the values for the Name and Description properties.

As with records, the user can define databases 907 for Profiles. Similarly, once the user defines the databases, the databases are made available for use in the Call Plan tree. Upon selecting the Untyped Database Value 909, the GAP system 103 creates a new database node and displays its properties. The user fills in values for all properties up to Key Structure and Data Structure.

The user can upload LDB data from an ASC PC 107 to the GAP system 103. In an exemplary embodiment, the file is formatted as a Comma Separated Value (CSV) file. The customers may also use formats from any number of standard applications; e.g., Microsoft Excel files. In a CSV file, each line in the file represents a row. Each row has a value for each key specified in the Key Structure property. A comma is the delimiter between field values; the first field value begins at the beginning of the line, and the last field value ends at the end of the line. The characters, other than quotes and commas, are treated as data. A comma in a quoted string is treated as data rather than a field delimiter. Quote characters inside a quoted string are treated as data. The user can copy LDB Data from a Profile order to a Database node. It is noted that the database IDs in the order and the Profile must match.

LDB Database nodes, in an exemplary embodiment, display LDB data in a table format with the names of the Key Structure and Data Structure fields used as column headings. The user can insert and delete rows and field in the LDB. An LDB cannot have more fields in a row than specified in the Key Structure and Data Structure properties. If the user saves an LDB with too many fields, the fields may be truncated. The system also warns the user if there are fewer field values than specified in the Key Structure and Data Structure properties.

The user can download LDB data from a Profile or an order to an ASC PC 107 for deployment to provisioning. Profile create orders do not provide LDB data. The user may click on some property fields to display a GUI List Editor and Choice Dialog box, which is used to define sub-properties for the following: call node, record node, database node, and message node. The call node may define TNT activation codes.

The user validates a Profile before making the profile available to customers. A valid Profile contains all information needed to build a call application. The following are the validation rules: a Profile must not contain any untyped nodes (except the last node); all required properties in all nodes must be specified; and all referenced audio files must exist.

An active Profile is available to the customer through TFNM 105. Activating a profile also triggers the manual provisioning process, so the profile must first be validated. On the Order Editor or GAP Editor screen, the user pulls down the Tools menu and selects Active to activate the profile. To inactivate the profile the user selects InActive.

The GUI screens of FIGS. 3-9 largely focused on the GAP system 103 as accessed by the ASC workstations (or PCs) 107. The customer may also access the features and capabilities of the GAP system 103 using a similar GUI via the ERM 105, as discussed below with respect to FIGS. 10-20. The feature set includes audio play, database access, take back and transfer (TNT), logic branching, logical comparison, call extension, multiple entry points, exits, DTMF input, jump, menu routing, recording audio, provisioning audio, manipulating data, and service independent voice recognition (SIVR).

Figure 10:
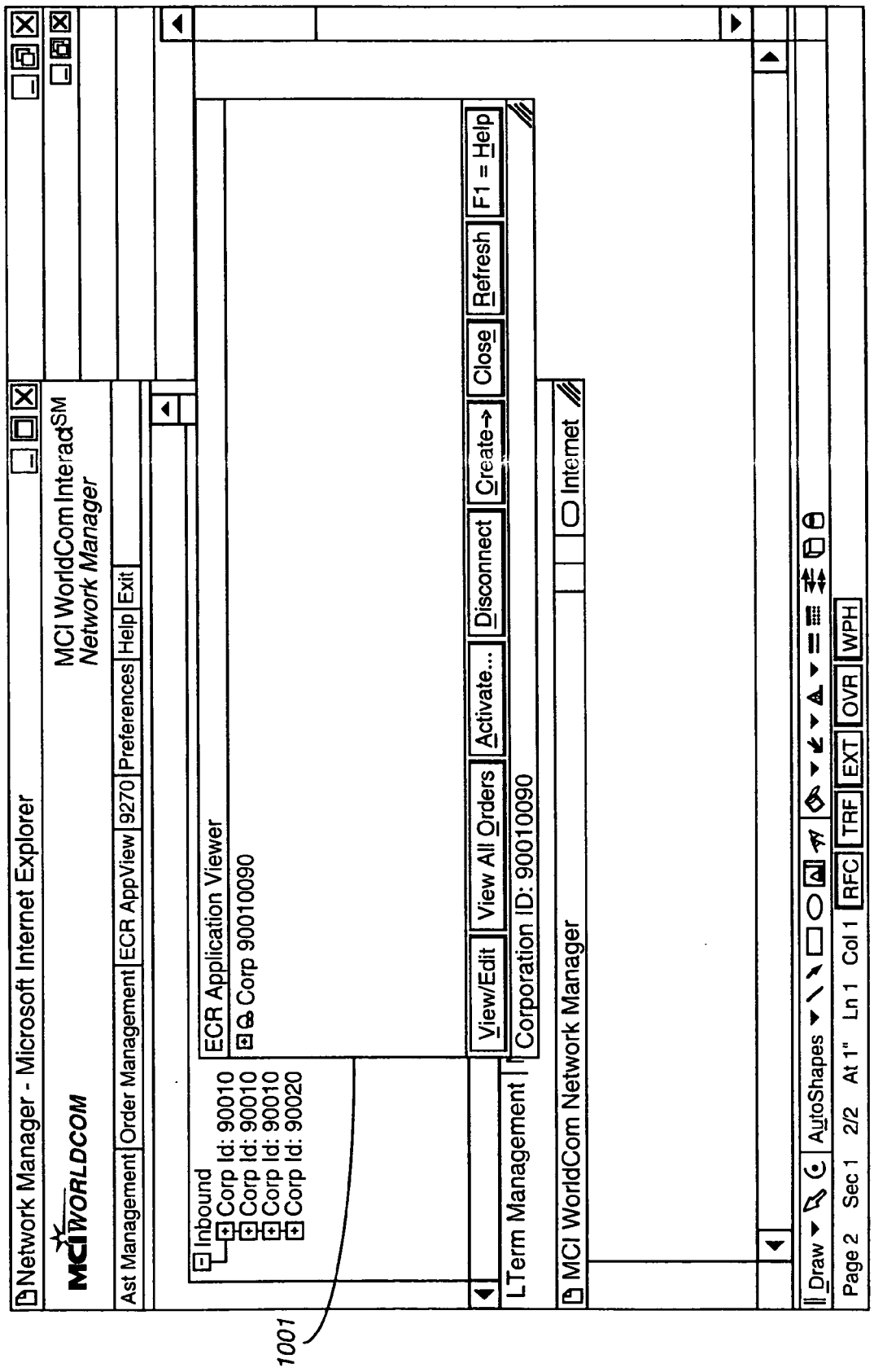
FIG. 10 is a diagram of an exemplary GUI screen displaying the identifiers corresponding to a customer in the Enhanced Routing Manager (ERM) system of FIGS. 1A and 1B.

FIG. 10 is a diagram of an exemplary GUI screen displaying the identifiers corresponding to a customer in the Enhanced Routing Manager (ERM) system of FIGS. 1A and 1B. Upon login in the ECR system 101, the customer workstation 107 is presented with an ECR Application Viewer window 1001. In this example, the window 1001 isolates a profile of a particular Corp ID that is selected by the customer. At this point, the customer may view all the existing applications by expanding the node.

Figure 11:
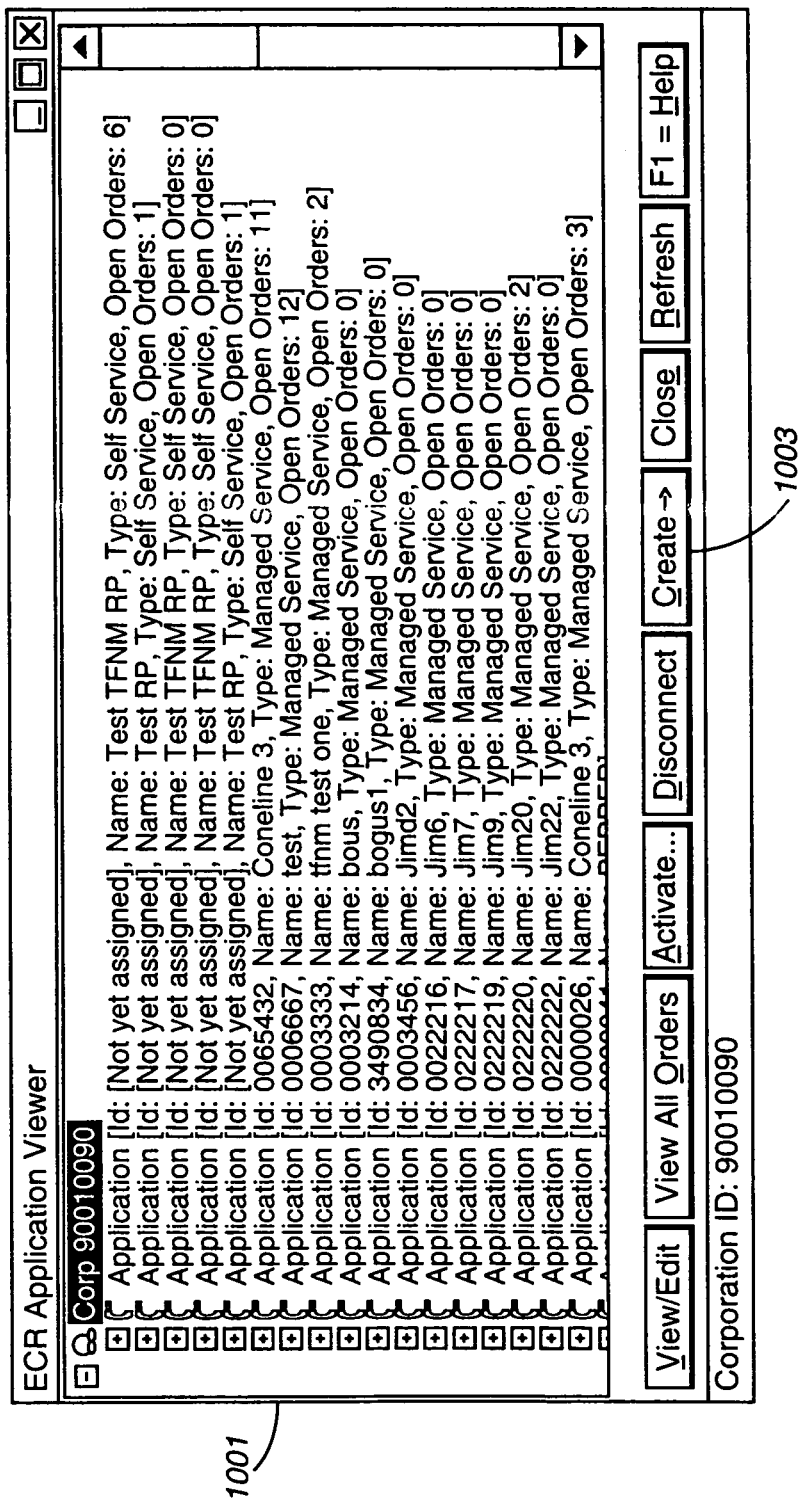
FIG. 11 is a diagram of an exemplary GUI screen for displaying applications associated with a customer in the ERM system of FIGS. 1A and 1B.

FIG. 11 shows the expanded view of the applications associated with the particular Corp ID. In this example, the top five applications have not been assigned an ID, indicating that these applications have been saved, but not submitted. To create a new application, the customer selects the Create button 1003, which pops up a Create Application window, as shown in FIG. 12.

Figure 12:
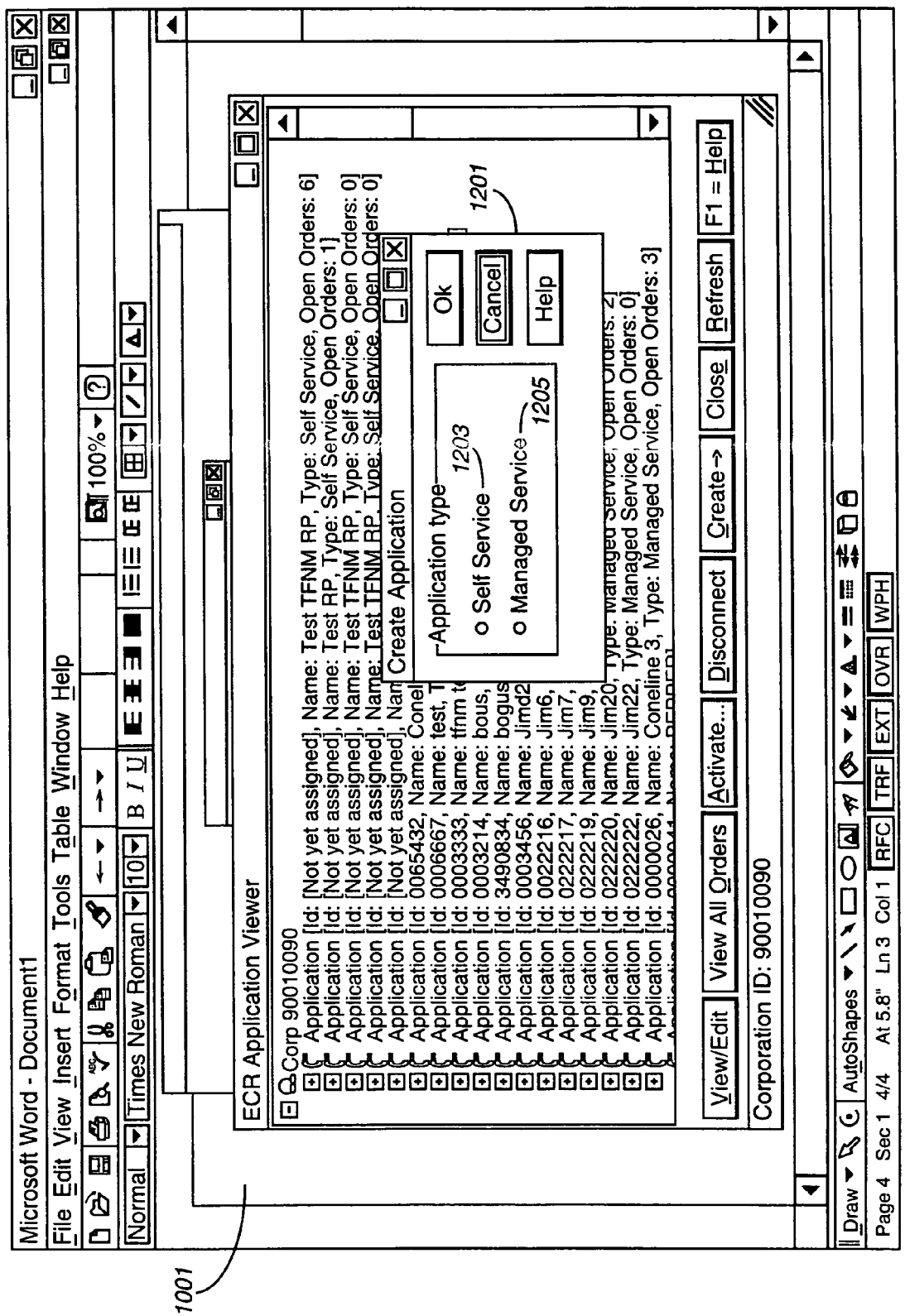
FIG. 12 is a diagram of a pop-up window for specifying the type of application as supported by the GUI of the ERM system of FIGS. 1A and 1B.

FIG. 12 is a diagram of a pop-up window for specifying the type of application as supported by the GUI of the ERM system of FIGS. 1A and 1B. The Create Application window 1201 allows the customer to specify whether the application is "Self Service" or "Managed Service". That is, if the customer seeks to create a customer-serviced application, the Self Service box 1203 is checked; alternatively, if a managed application is desired, the Managed Service box 1205 is checked.

Figure 13:
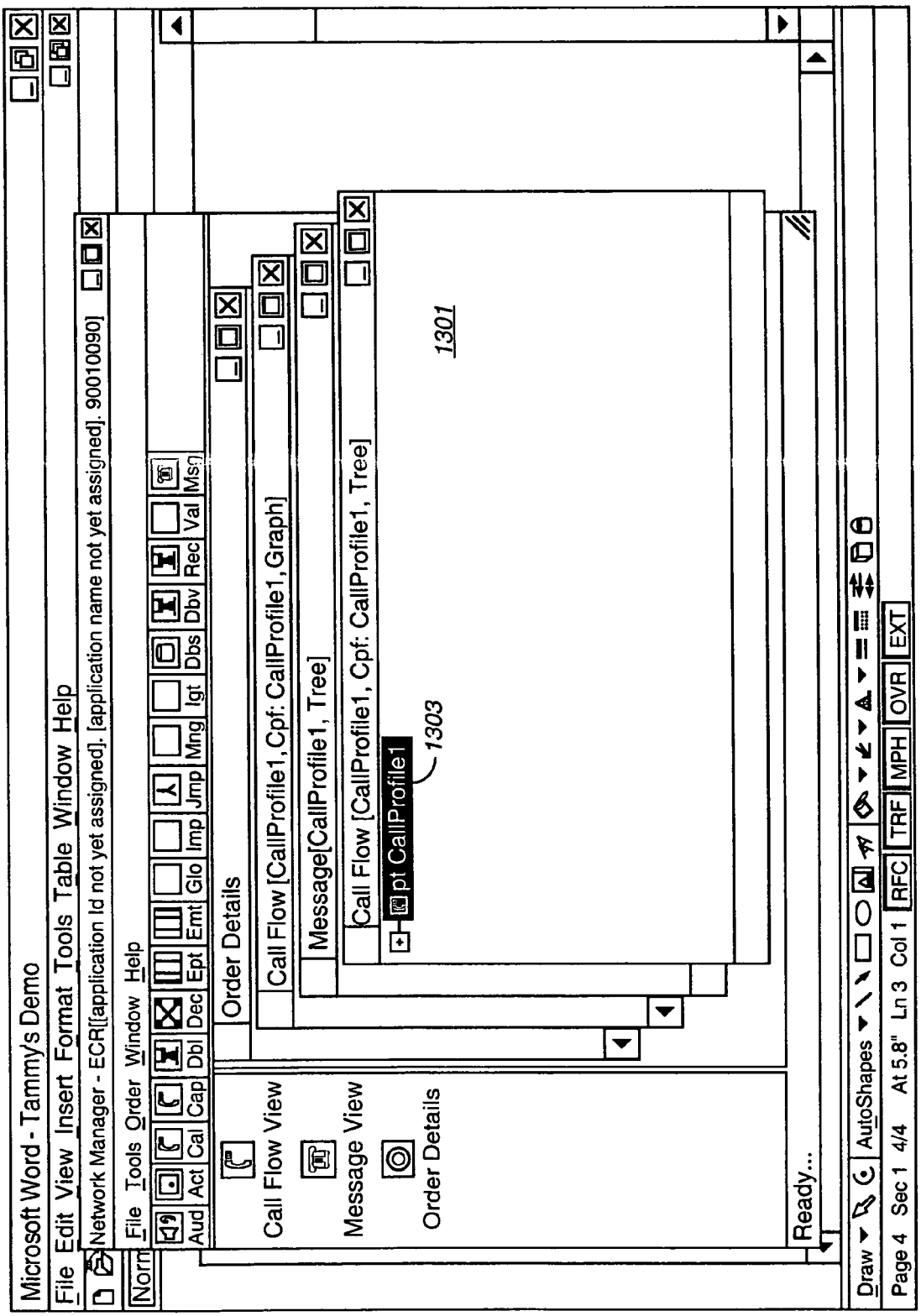
FIG. 13 is a diagram of an exemplary GUI screen for displaying a call profile node as supported by the GUI of the ERM system of FIGS. 1A and 1B.

FIG. 13 is a diagram of an exemplary GUI screen for displaying a call profile node as supported by the GUI of the ERM system of FIGS. 1A and 1B. Continuing with the example of FIG. 12, assuming the customer selects a new self-serviced application, a Call Profile screen 1301 is displayed. The customer may view a drop down menu by clicking on the Call Profile node 1303 detailing the call profile, as shown in FIG. 14.

Figure 14:
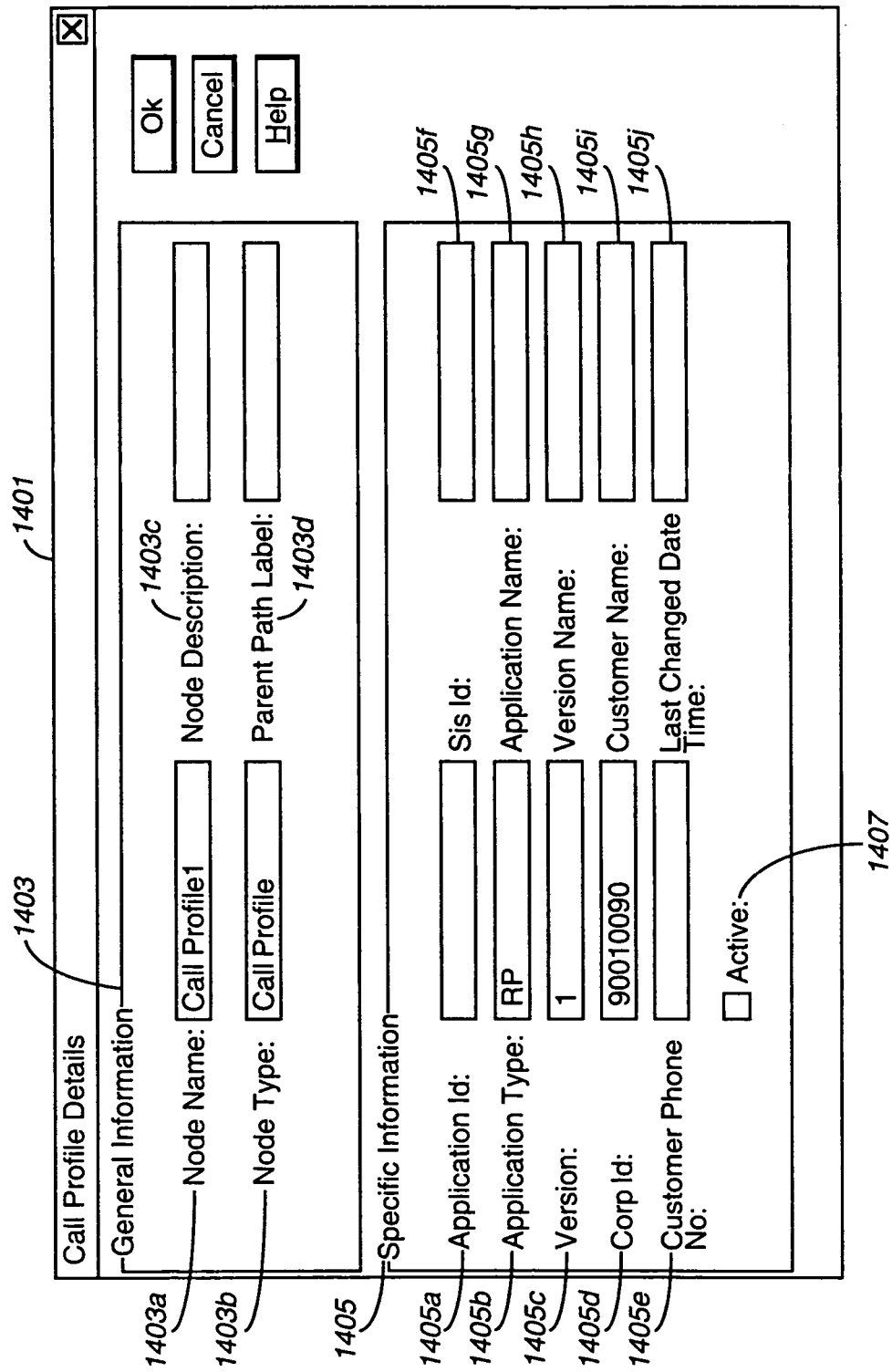
FIG. 14 is a diagram of an exemplary GUI screen for displaying the details of a call profile as supported by the GUI of the ERM system of FIGS. 1A and 1B.

FIG. 14 is a diagram of an exemplary GUI screen for displaying the details of a call profile as supported by the GUI of the ERM system of FIGS. 1A and 1B. The Call Profile Details screen 1401 specifies two information areas that provide for the profile node properties as earlier discussed: a general information area 1403 and a specific information area 1405. The general information area 1403 includes a Node Name field 1403*a*, a Node Type field 1403*b*, a Node Description field 1403*c*, and a Parent Path Label field 1403*d*. The specific information area 1405 include the following fields: Application ID 1405*a*, Application Type 1405*b*, Version 1405*c*, Corp ID 1405*d*, Customer Phone No. 1405*e*, SIS ID 1405*f*, Application Name 1405*g*, Version Name 1405*h*, Customer Name 1405*i*, and Last Changed Date Time 1405*j*. It is noted that certain fields are inactive or automatically filled in for the particular call profile: the Node Type 1403*b*, Application ID 1405*a*, Application Type 1405*b*, Version 1405*c*, Corp ID 1405*d*, SIS ID 1405*f*, and Last Changed Date Time 1405*j*.

The Call Profile Details screen 1401 also includes an Active box 1407 that permits the customer to indicate whether the call profile is to be active.

Figure 15:
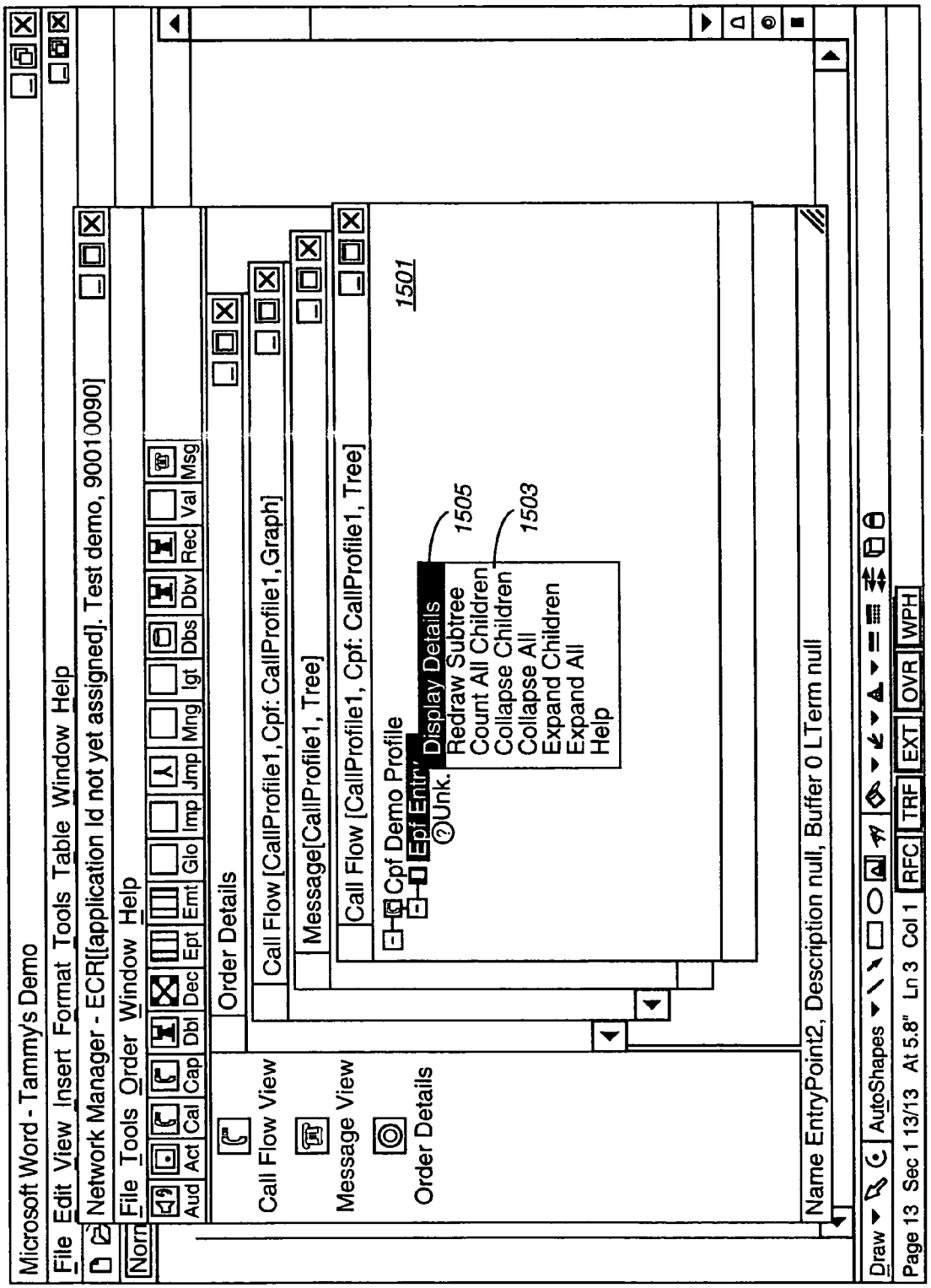
FIGS. 15 and 16 are diagrams of exemplary GUI screens for displaying an entry point node as supported by the GUI of the ERM system of FIGS. 1A and 1B.
Figure 16:
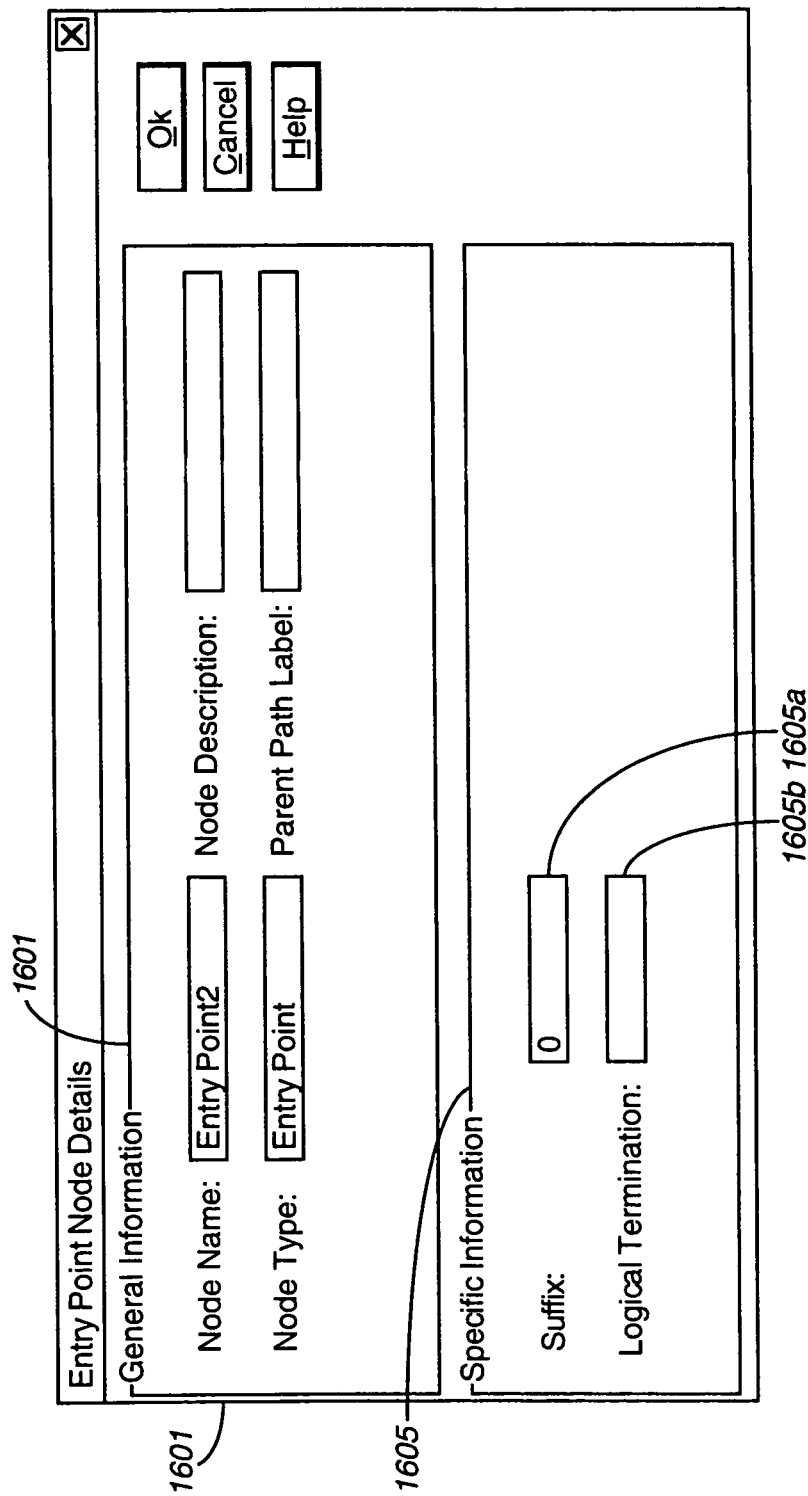

FIGS. 15 and 16 are diagrams of exemplary GUI screens for displaying an entry point node as supported by the GUI of the ERM system of FIGS. 1A and 1B. An entry point node is shown in a GUI screen 1501, in which a drop down menu 1503 is shown. Upon selecting the Display Details 1505 option, the customer is shown an Entry Point Node Details screen 1601 (FIG. 16). The Entry Point Node Details screen 1601 shows a general information area 1603 that is identical to that of the Call Profile Details screen 1403 (FIG. 14). A specific information area 1605 includes a suffix field 1605*a* and a Logical Termination field 1605*b*.

Figure 17:
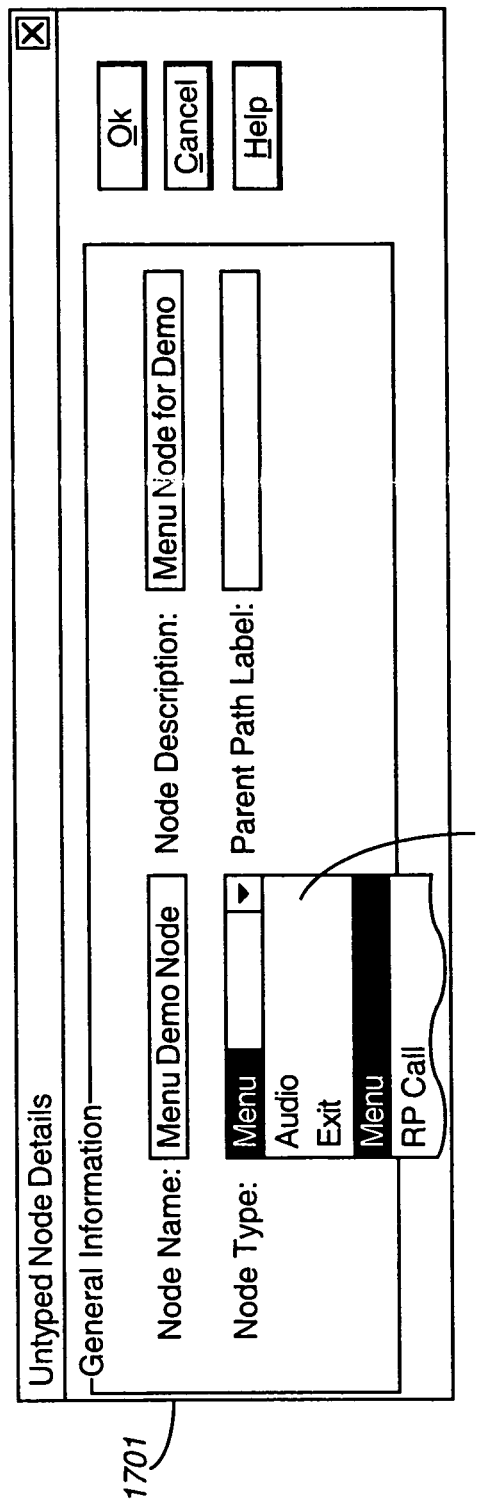
FIG. 17 is a diagram of an exemplary GUI screen for displaying the details of an untyped node as supported by the GUI of the ERM system of FIGS. 1A and 1B.

FIG. 17 is a diagram of an exemplary GUI screen for displaying the details of an untyped node as supported by the GUI of the ERM system of FIGS. 1A and 1B. An Untyped Node Details screen 1701 displays properties of the node, whereby the customer may specify the type of node using a pull down menu.

Figure 18:
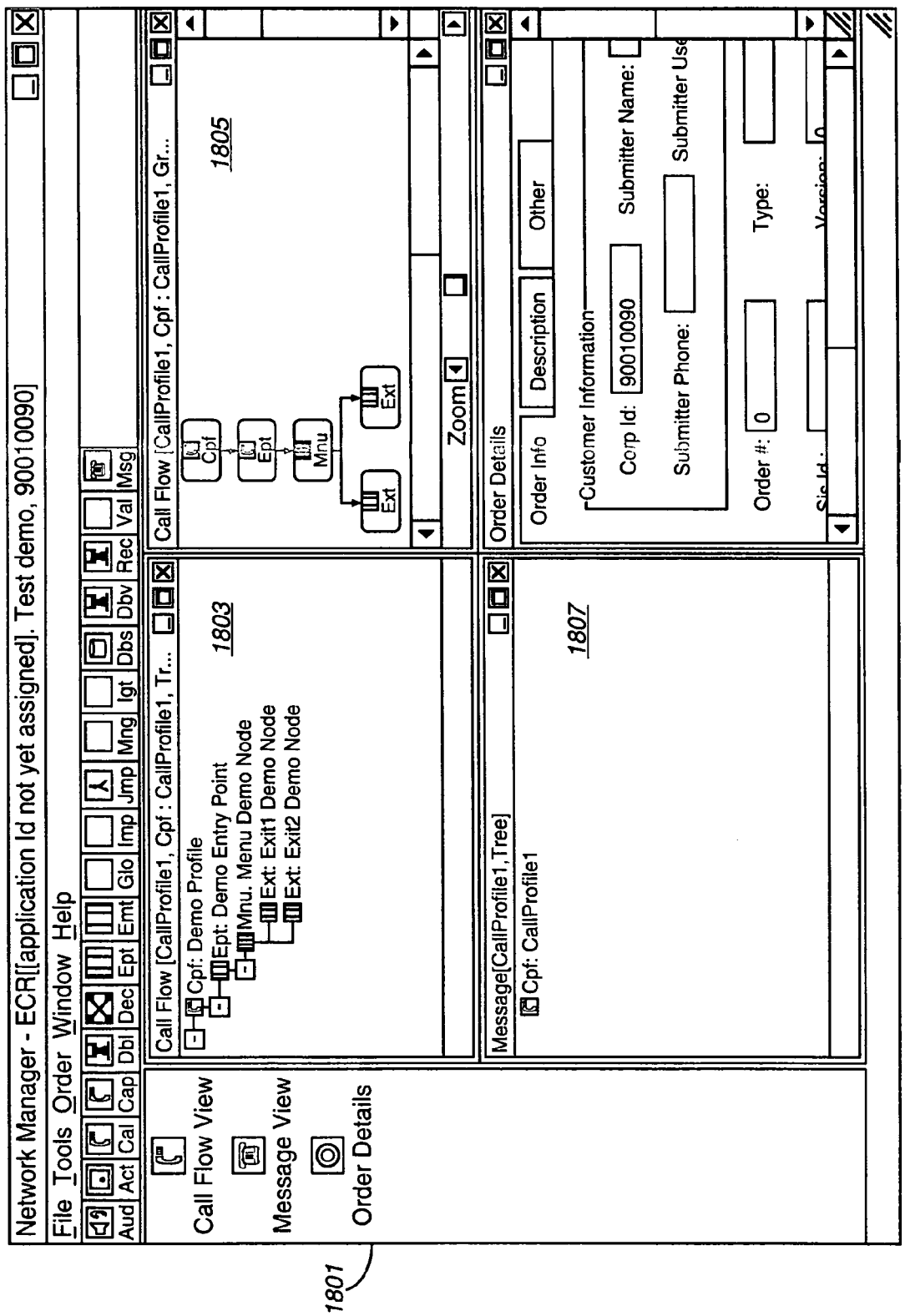
FIG. 18 is a diagram of an exemplary GUI screen for displaying multiple views as supported by the GUI of the ERM system of FIGS. 1A and 1B.
Figure 19:
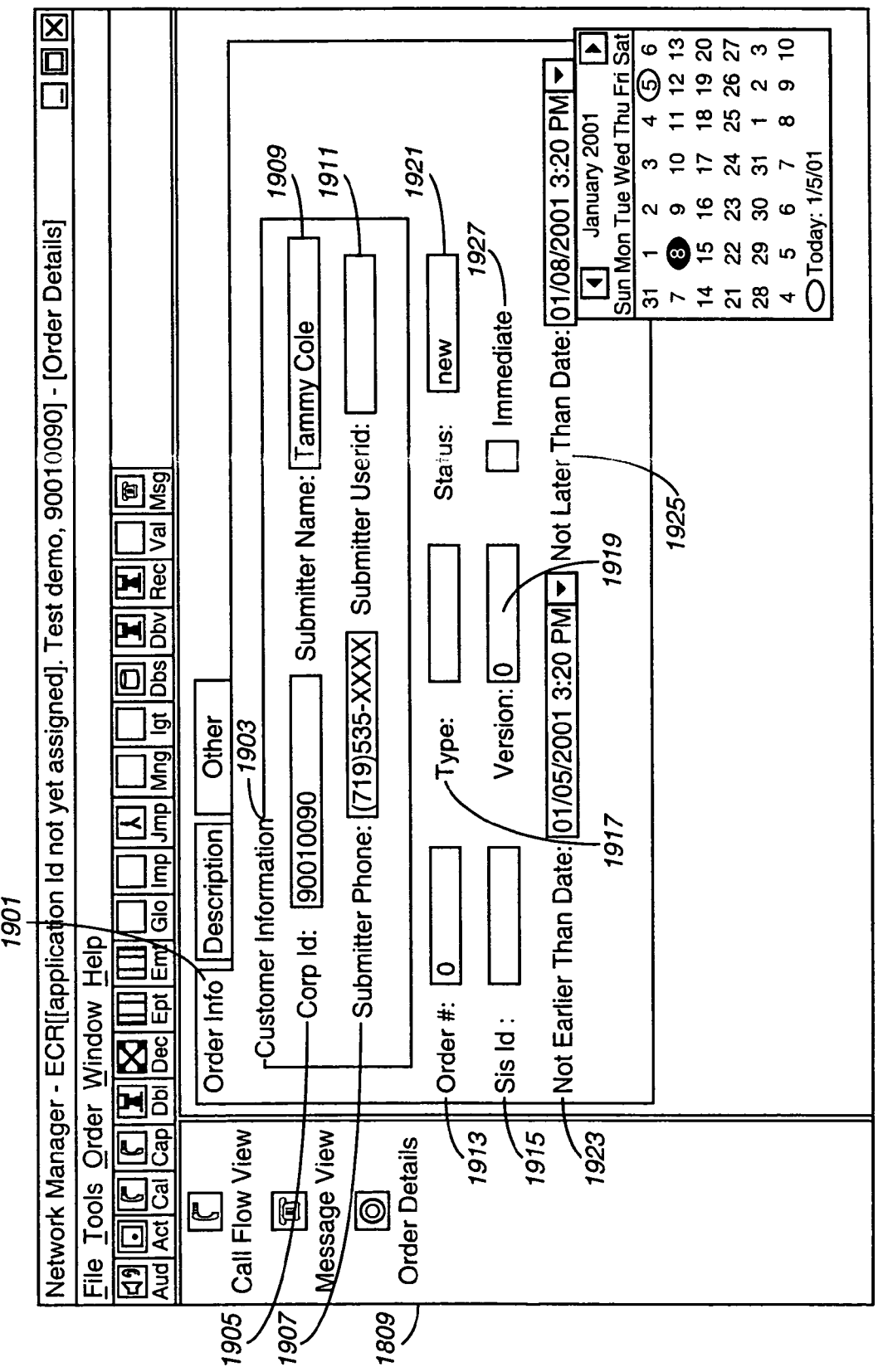
FIGS. 19 and 20 are diagrams of an exemplary GUI screen for specifying order information and for indicating that an order has passed validation as supported by the GUI of the ERM system of FIGS. 1A and 1B.

FIG. 18 is a diagram of an exemplary GUI screen for displaying multiple views as supported by the GUI of the ERM system of FIGS. 1A and 1B. As shown, the GUI screen 1801 supports two different views 1803 and 1805 of the call flow. A message screen 1807 is also displayed, along with an Order Details screen 1809. FIG. 19 shows a maximized Order Details screen 1809.

Figure 20:
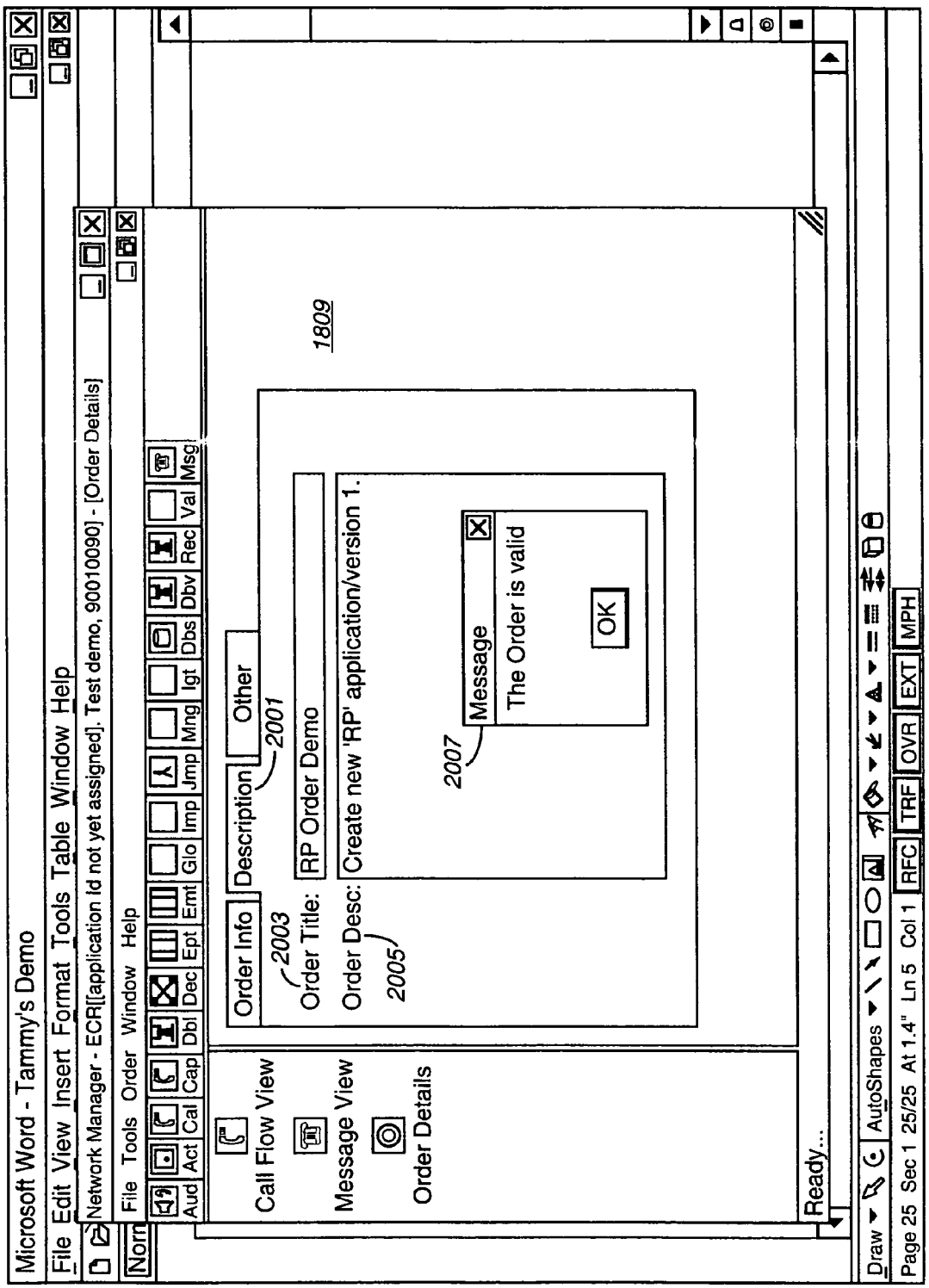

FIGS. 19 and 20 show diagrams of an exemplary GUI screen for specifying order information and for indicating that an order has passed validation as supported by the GUI of the ERM system of FIGS. 1A and 1B. The Order Details screen 1809 displays an Order Info tab 1901, which provides a Customer Information area 1903 with the following fields: Corp ID 1905, Submitter Phone 1907, Submitter Name 1909, and Submitter UserID 1911. In addition, the Order Info tab 1901 shows an Order Number field 1913, a SIS ID field 1915, a Type field 1917, a Version field 1919, and a Status field 1921. Further, a Not Earlier Than Date field 1923 and a Not Later Than Date field 1925 provide the customer with a capability to specify a time range for the start date of the order. As shown, these fields 1923 and 1925 may be set using a pull down menu. Also, an Immediate box 1927 is provided to enable the customer to indicate that the order should take immediate effect.

Furthermore, the GUI screen 1809 also contains a Description tab 2001, as shown in FIG. 20. The Description tab 2001 permits the customer to supply a title to the order, per the Order Title field 2003, as well as a description of the order through the use of an Order Description field 2005. Upon submitting the order, the customer is subsequently provided with a message to indicate whether the order has passed validation by the ECR system 101. In this example, FIG. 20 also shows a diagram of a pop-up window 2007 indicating that an order has passed validation.

Figure 21:
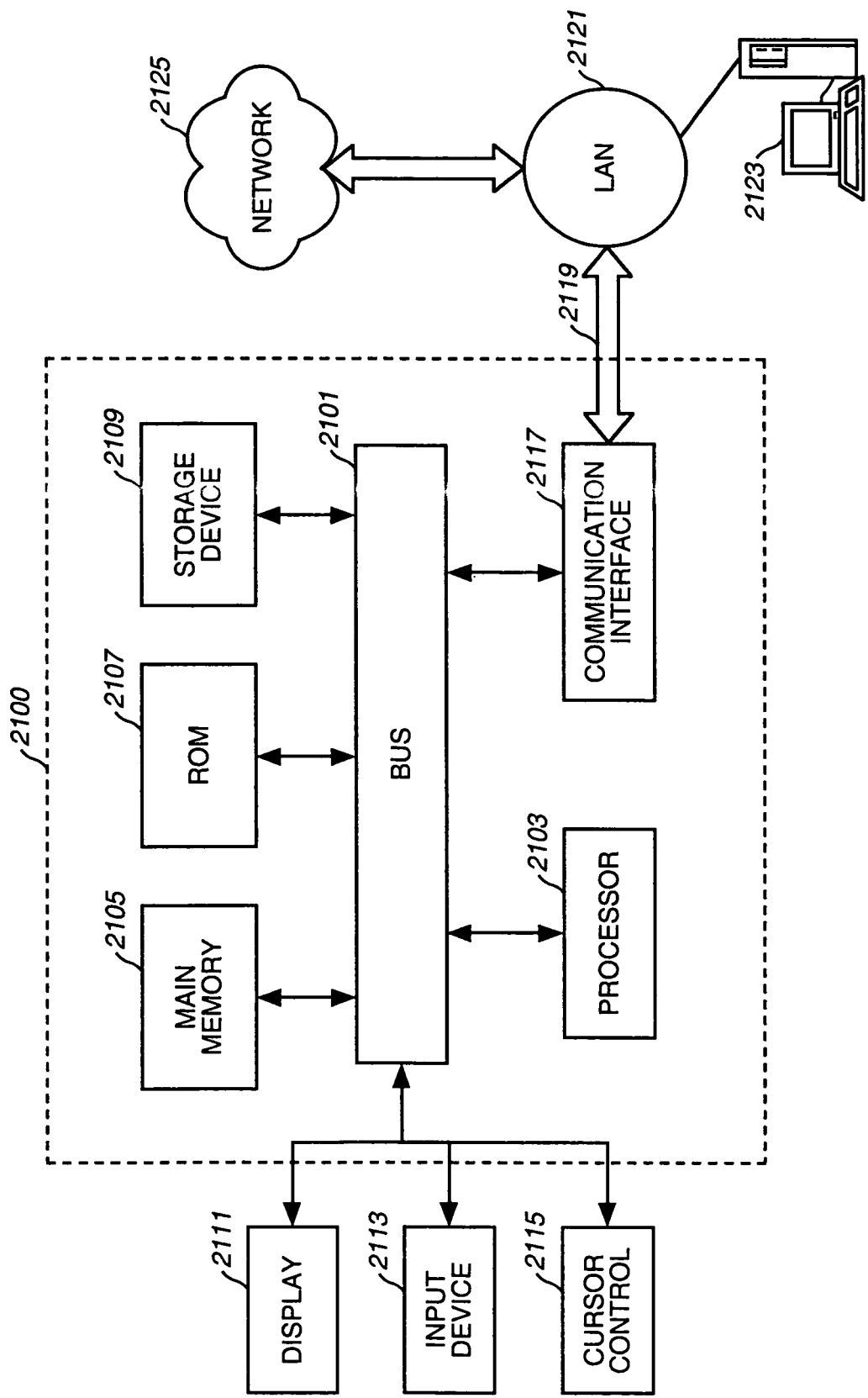
FIG. 21 is a diagram of a computer system that can be used to implement an embodiment of the present invention.

FIG. 21 illustrates a computer system 2100 upon which an embodiment according to the present invention can be implemented. The computer system 2100 includes a bus 2101 or other communication mechanism for communicating information, and a processor 2103 coupled to the bus 2101 for processing information. The computer system 2100 also includes main memory 2105, such as a random access memory (RAM) or other dynamic storage device, coupled to the bus 2101 for storing information and instructions to be executed by the processor 2103. Main memory 2105 can also be used for storing temporary variables or other intermediate information during execution of instructions to be executed by the processor 2103. The computer system 2100 further includes a read only memory (ROM) 2107 or other static storage device coupled to the bus 2101 for storing static information and instructions for the processor 2103. A storage device 2109, such as a magnetic disk or optical disk, is additionally coupled to the bus 2101 for storing information and instructions.

The computer system 2100 may be coupled via the bus 2101 to a display 2111, such as a cathode ray tube (CRT), liquid crystal display, active matrix display, or plasma display, for displaying information to a computer user. An input device 2113, such as a keyboard including alphanumeric and other keys, is coupled to the bus 2101 for communicating information and command selections to the processor 2103. Another type of user input device is cursor control 2115, such as a mouse, a trackball, or cursor direction keys for communicating direction information and command selections to the processor 2103 and for controlling cursor movement on the display 2111.

According to one embodiment of the invention, the GUI of FIGS. 3-20 is provided by the computer system 2100 in response to the processor 2103 executing an arrangement of instructions contained in main memory 2105. Such instructions can be read into main memory 2105 from another computer-readable medium, such as the storage device 2109. Execution of the arrangement of instructions contained in main memory 2105 causes the processor 2103 to perform the process steps described herein. One or more processors in a multi-processing arrangement may also be employed to execute the instructions contained in main memory 2105. In alternative embodiments, hard-wired circuitry may be used in place of or in combination with software instructions to implement the embodiment of the present invention. Thus, embodiments of the present invention are not limited to any specific combination of hardware circuitry and software.

The computer system 2100 also includes a communication interface 2117 coupled to bus 2101. The communication interface 2117 provides a two-way data communication coupling to a network link 2119 connected to a local network 2121. For example, the communication interface 2117 may be a digital subscriber line (DSL) card or modem, an integrated services digital network (ISDN) card, a cable modem, or a telephone modem to provide a data communication connection to a corresponding type of telephone line. As another example, communication interface 2117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 2117 sends and receives electrical, electromagnetic, or optical signals that carry digital data streams representing various types of information. Further, the communication interface 2117 can include peripheral interface devices, such as a Universal Serial Bus (USB) interface, a PCMCIA (Personal Computer Memory Card International Association) interface, etc.

The network link 2119 typically provides data communication through one or more networks to other data devices. For example, the network link 2119 may provide a connection through local network 2121 to a host computer 2123, which has connectivity to a network 2125 (e.g. a wide area network (WAN) or the global packet data communication network now commonly referred to as the "Internet") or to data equipment operated by service provider. The local network 2121 and network 2125 both use electrical, electromagnetic, or optical signals to convey information and instructions. The signals through the various networks and the signals on network link 2119 and through communication interface 2117, which communicate digital data with computer system 2100, are exemplary forms of carrier waves bearing the information and instructions.

The computer system 2100 can send messages and receive data, including program code, through the network(s), network link 2119, and communication interface 2117. In the Internet example, a server (not shown) might transmit requested code belonging an application program for implementing an embodiment of the present invention through the network 2125, local network 2121 and communication interface 2117. The processor 2104 may execute the transmitted code while being received and/or store the code in storage device 219, or other non-volatile storage for later execution. In this manner, computer system 2100 may obtain application code in the form of a carrier wave.

The term "computer-readable medium" as used herein refers to any medium that participates in providing instructions to the processor 2104 for execution. Such a medium may take many forms, including but not limited to non-volatile media, volatile media, and transmission media. Non-volatile media include, for example, optical or magnetic disks, such as storage device 2109. Volatile media include dynamic memory, such as main memory 2105. Transmission media include coaxial cables, copper wire and fiber optics, including the wires that comprise bus 2101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly the present invention provides a graphical approach for customers of a service provider to create call plan applications. The graphical system provides a "self-managed" and automated service from the perspective of the customer. This approach advantageously minimizes errors that are introduced by a manual, paper-based process of developing call plan applications.

While the present invention has been described in connection with a number of embodiments and implementations, the present invention is not so limited but covers various obvious modifications and equivalent arrangements, which fall within the purview of the appended claims.

What is claimed is:

1. A method for developing a call application, the method comprising:

initiating display of a graphical user interface (GUI) that includes, a create application image for prompting a user for selection of an application, the application including a self-service application for controlling a call flow, a status image for providing information on status of testing of the application, wherein the application is web-based and deployable in real-time, and a call profile screen corresponding to the call flow, the call profile screen specifying a call profile that provides information about the call flow to generate the application; and validating the call profile by the user prior to making the call profile available to customers by ensuring that the call profile contains all information necessary to build a call application.

2. A method according to claim 1, wherein the call profile includes a runnable profile that automatically converts into the application.

3. A method according to claim 1, wherein the graphical user interface (GUI) further includes an image for indicating that the application is valid in response to successful testing of the application.

4. A method according to claim 1, wherein the application supports a predefined feature set including one of audio play, database access, take back and transfer (TNT), logic branching, logical comparison, call extension, multiple entry points, exits, DTMF (Dual-Tone Multi-Frequency) input, jump, menu routing, recording audio, provisioning audio, manipulating data, or service independent voice recognition.

5. An apparatus for developing a call, the apparatus comprising:

a processor configured to initiate display of a graphical user interface (GUI) that includes, a create application image for prompting a user for selection of an application, the application including a self-service application for controlling a call flow, a status image for providing information on status of testing of the application, wherein the application is web-based and deployable in real-time, and a call profile screen corresponding to the call flow, the call profile screen specifying a call profile that provides information about the call flow to generate the application, the call profile being validated by the user prior to making the call profile available to customers by ensuring that the call profile contains all information necessary to build a call application.

6. An apparatus according to claim 5, wherein the call profile includes a runnable profile that automatically converts into the application.

7. An apparatus according to claim 5, wherein the graphical user interface (GUI) further includes an image for indicating that the application is valid in response to successful testing of the application.

8. An apparatus according to claim 5, wherein the application supports a predefined feature set including one of audio play, database access, take back and transfer (TNT), logic branching, logical comparison, call extension, multiple entry points, exits, DTMF (Dual-Tone Multi-Frequency) input, jump, menu routing, recording audio, provisioning audio, manipulating data, or service independent voice recognition.

9. A system for developing a call application, the system comprising:

an input device configured to receive an input from a user; and a display configured to present a graphical user interface (GUI) that includes, a create application image for prompting the user for selection of an application, the application including a self-service application for controlling a call flow, a status image for providing information on status of testing of the application, wherein the application is web-based and deployable in real-time, and a call profile screen corresponding to the call flow, the call profile screen specifying a call profile that provides information about the call flow to generate the application, the call profile being validated by the user prior to making the call profile available to customers by ensuring that the call profile contains all information necessary to build a call application.

10. A system according to claim 9, wherein the call profile includes a runnable profile that automatically converts into the application.

11. A system according to claim 9, wherein the graphical user interface (GUI) further includes an image for indicating that the application is valid in response to successful testing of the application.

12. A system according to claim 9, wherein the application supports a predefined feature set including one of audio play, database access, take back and transfer (TNT), logic branching, logical comparison, call extension, multiple entry points, exits, DTMF (Dual-Tone Multi-Frequency) input, jump, menu routing, recording audio, provisioning audio, manipulating data, or service independent voice recognition.

13. The method according to claim 1, wherein rules for validating a call profile include:

a profile must not contain any untyped nodes other than a last node;

all required properties of all nodes must be specified; and all referenced audio files must exist.

* * * * *